United States Patent [19]

Loftus et al.

[11] 4,426,785

[45] Jan. 24, 1984

[54] METHOD AND APPARATUS FOR DETECTING ABNORMAL THICKNESS CONDITIONS SUCH AS FOLDED AND/OR MISSING CORNERS OF MOVING SHEETS

[76] Inventors: Peter J. Loftus, 56 Roving Rd., Levittown, Pa. 19056; Stephen J. Horvath, 5752 Prescott Ct., Bensalem, Pa. 19020

[21] Appl. No.: 336,790

[22] Filed: Jan. 4, 1982

[51] Int. Cl.³ ............................ G01B 7/04; B65H 3/14
[52] U.S. Cl. ................................ 33/147 L; 33/148 H; 33/149 J; 271/12
[58] Field of Search ............. 33/147 L, 143 L, 148 H, 33/149 J, 182, 125 T; 209/603, 564; 271/12, 57

[56] References Cited

U.S. PATENT DOCUMENTS

| | | | |
|---|---|---|---|
| 2,632,545 | 3/1953 | Schubert | 209/603 |
| 2,858,614 | 11/1958 | Schuenemann, Jr. | 33/148 H |
| 3,158,369 | 11/1964 | Blenner et al. | 271/57 |
| 3,182,301 | 5/1965 | Kolb | 340/259 |
| 3,348,313 | 10/1967 | Urmenyi | 33/148 H |
| 3,593,989 | 7/1971 | Crittenden et al. | 271/57 |
| 3,921,300 | 11/1975 | Cox et al. | 33/125 T |
| 4,060,734 | 11/1977 | Tilley et al. | 33/147 L |
| 4,068,385 | 1/1978 | Mitzel | 33/143 |
| 4,095,781 | 6/1978 | Kistner et al. | 271/12 |
| 4,121,716 | 10/1978 | Luperti et al. | 209/564 |
| 4,136,454 | 1/1979 | Jenkins et al. | 33/147 L |
| 4,141,149 | 2/1979 | George et al. | 33/125 T |
| 4,232,447 | 11/1980 | Grunder et al. | 33/147 L |
| 4,301,598 | 11/1981 | Scardapane | 33/147 L |

Primary Examiner—Willis Little
Attorney, Agent, or Firm—Weinstein & Sutton

[57] ABSTRACT

Sheets moving in a feed direction and arranged at spaced intervals are fed through nips arranged to rollingly engage opposing sides of the sheet, each nip being formed by a roller rotating about a fixed axis and a cooperating swingably mounted roller. Resilient adjustable biasing means urges an assembly upon which the swingably mounted roller is pivotally mounted, as well as an arm forming part of the pivotally mounted roller assembly, in a first direction. A sensor is positioned adjacent the free end of said arm. Sheets moving through said nip cause displacement of said pivotal assembly against the biasing force in accordance with the thickness of the sheet passing through the nip. The biasing means comprises a thick, and accurate resilient element designed to permit the roller assembly to follow even abrupt thickness changes rapidly and accurately without experiencing overshoot or undershoot. The sensor senses the position of a field generating element mounted upon the free end of said arm to provide a signal representative of the size and direction of the displacement. The output signals developed during the passage of a sheet through said nips are compared against a threshold. The sensors are periodically examined to provide an offset signal for automatically compensating for changes in output signal strength due to changes in temperature, the new zero offset being generated during the time that no sheet is passing between the aforesaid nips. The offset signal is combined with the sensor signal to provide a compensated sensor signal which is then compared with a reference level representing a predetermined thickness.

52 Claims, 22 Drawing Figures

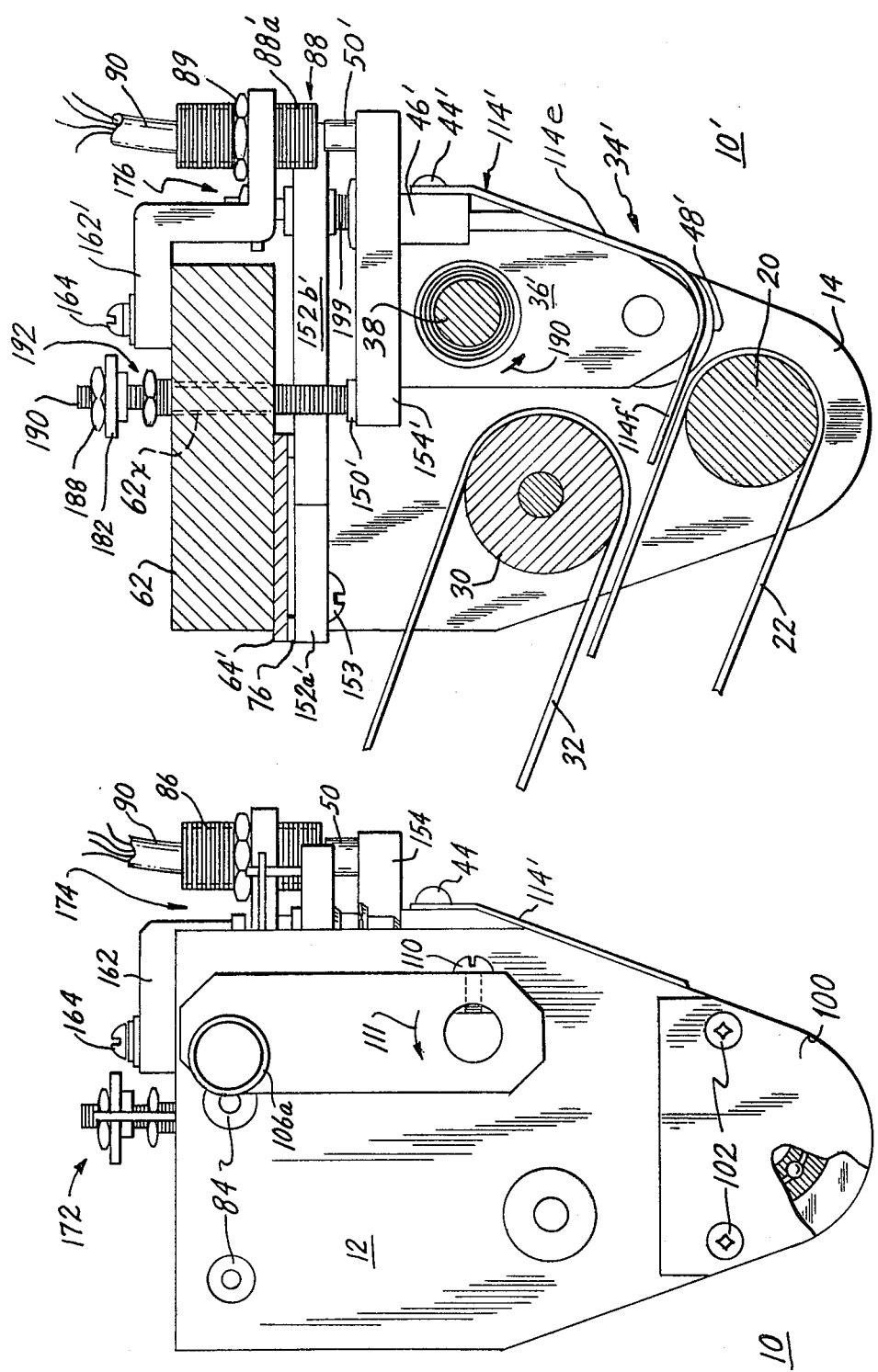

METHOD AND APPARATUS FOR DETECTING ABNORMAL THICKNESS CONDITIONS SUCH AS FOLDED AND/OR MISSING CORNERS OF MOVING SHEETS

FIELD OF THE INVENTION

The present invention relates to sheet thickness detectors and more particularly to a novel method and apparatus for detecting the presence of abnormal thickness conditions such as creases, tape and folded corners of sheets as they are fed through the detector at high speed and including means for preventing the detection sensor from experiencing swings due to overshoot or undershoot while, at the same time, permitting the sensor to accurately track thickness and electronic means for automatically adjusting the sensitivity of the sensor signal prior to the examination of each sheet.

BACKGROUND OF THE INVENTION

The present invention is designed to provide apparatus for detecting the presence of folded corners of sheets, as well as other abnormal thickness conditions. Sheets, and especially paper sheets, such as, for example, paper currency, experience a large amount of manual handling which quite frequently leads to bending, creasing and tearing of the paper currency as well as experiencing a general deterioration and accumulation of foreign matter which may be liquid and/or solid. The more abuse experienced by paper currency, the sooner it becomes necessary to take paper currency out of circulation.

Before newly printed paper currency is placed into circulation, it is quite stiff and, of course, clean. New or slightly used paper currency, or at least paper currency which experiences careful handling, is extremely advantageous for use in automatic dispensing equipment, such as automated 24-hour teller systems. Automated equipment of this nature is manufactured to meet tight, high-precision tolerances and will tend to malfunction or jam in the presence of unfit currency. Currency which is unfit for use in such equipment, even though quite new, is currency which has been severely folded or creased, repaired by a tape strip as a result of having been partially or completely torn through and/or currency having folded corners.

It is important to be able to differentiate between fit and unfit currency when handling such currency, for example, in day-to-day banking applications. Since the volume of currency handled by a bank on a typical day is quite large, it is extremely important to provide equipment for handling and counting such currency and to determine the fitness or unfitness or said currency at high operating speeds.

Although equipment presently exists for detecting the presence of folded corners, such equipment is either sluggish, lacks the desired sensitivity or lacks the ability to provide for instantaneous adjustment due to gradual or even relatively abrupt changes in either the mechanical or the electronic components thereof.

BRIEF DESCRIPTION OF THE INVENTION

The present invention is characterized by comprising apparatus for detecting abnormal thickness conditions such as folded corners of sheets moving through the detection apparatus at high speed. The detection apparatus comprises an elongated common roller arranged to rotate about a stationary axis and a pair of rollers respectively rotatably mounted to first and second swingably mounted assemblies, each assembly further including a support arm for supporting a field generating element at the free end thereof. Resilient biasing means in the form of a thick metallic member is mounted in a cantilevered fashion and is provided with an adjustment member arranged to bear against an anvil provided on each swingably mounted assembly to urge the rollers arranged on said assemblies toward the aforesaid common roller.

Sensor means positioned in close proximity to each field generating element develops a signal representative of document thickness in accordance with the relative displacement of a field generating element associated with the sensor. As sheets pass through the nips formed by the swingably mounted rollers and the aforesaid common roller, rollers track the thickness of each sheet along longitudinal lengthwise strips thereof. As a sheet initially enters said nips, the thickness changes abruptly. The resilient biasing element is designed to be very fast to react to abrupt changes while at the same time preventing unnecessary swings, i.e. overshoots, in the thickness signals whereby the signals developed are maintained within an extremely practical working range and are quite faithful reproductions of the sheet thickness including folded corners or tape in the path of the rollers.

Detection means detect the interval between adjacent sheets, i.e. during which no sheet is passing through the aforesaid nips in order to adjust the D.C. offset level of each signal representing thickness to compensate for any changes in the signals developed by the sensors due to either gradual or abrupt changes in ambient temperature.

The entry of a sheet into the aforesaid nips causes a sensor to develop a signal which is representative of the profile of the sheet measured in the feed direction. Electronic means are provided for developing an offset signal which automatically adjusts the output signal for each sensor, which offset signals combine with the signal developed for generating a temperature compensated signal which is then compared against a reference signal whose level is preset to represent the thickness of an acceptable sheet. The sensor develops a signal representative of deviations from normal thickness to activate a staircase generator which remains operative so long as the sensor signal exceeds the aforesaid reference level. A second reference level signal is compared against the output level of the staircase generator to develop a reject signal in the event that the deviation from normal thickness persists for a predetermined time period. which signal is representative of the length of a folded corner and is utilized to determine the fitness or unfitness of each sheet.

The system detects the presence of folded corners at both leading and trailing edges as well as any other abnormal thickness condition enabling a determination to be made of the relative fitness or unfitness of each sheet. The detection apparatus examines sheets at high speeds and is capable of examining sheets moving at a feed rate of greater than 400 sheets per minute.

OBJECTS OF THE INVENTION AND BRIEF DESCRIPTION OF THE FIGURES

It is therefore one object of the present invention to provide a novel method and apparatus for handling sheets at extremely high speed and for testing said sheets to determine if folded corners are present.

Still another object of the present invention is to provide means for handling sheets at extremely high speeds and for testing said sheets to determine the presence of folded corners, tape and other abnormal thickness conditions through the use of sensor means for detecting the displacement of a swingably mounted roller assembly relative to a fixed roller and including mechanical bias means for assuring faithful reproduction of the sheet profile, while significantly attenuating overshoot and undershoot, thereby facilitating the performance of a highly sensitive and accurate detection operation.

Still another object of the present invention is to provide a novel method and apparatus for periodically and automatically compensating for drift in the output signal of the electrical sensors caused by changes in ambient temperature.

Still another object of the present invention is to provide a novel method and apparatus for periodically adjusting the signal of the sensor devices during the times that no sheets are being examined by the folded corner detection apparatus.

Still another object of the present invention is to provide a novel method and apparatus for detecting for changes in thickness of sheets and for detecting the persistence intervals of such changes in thickness to determine the fitness of said sheets.

The above, as well as other objects of the present invention, will become apparent when reading the accompanying description of the drawings, in which.

Figure 7A:
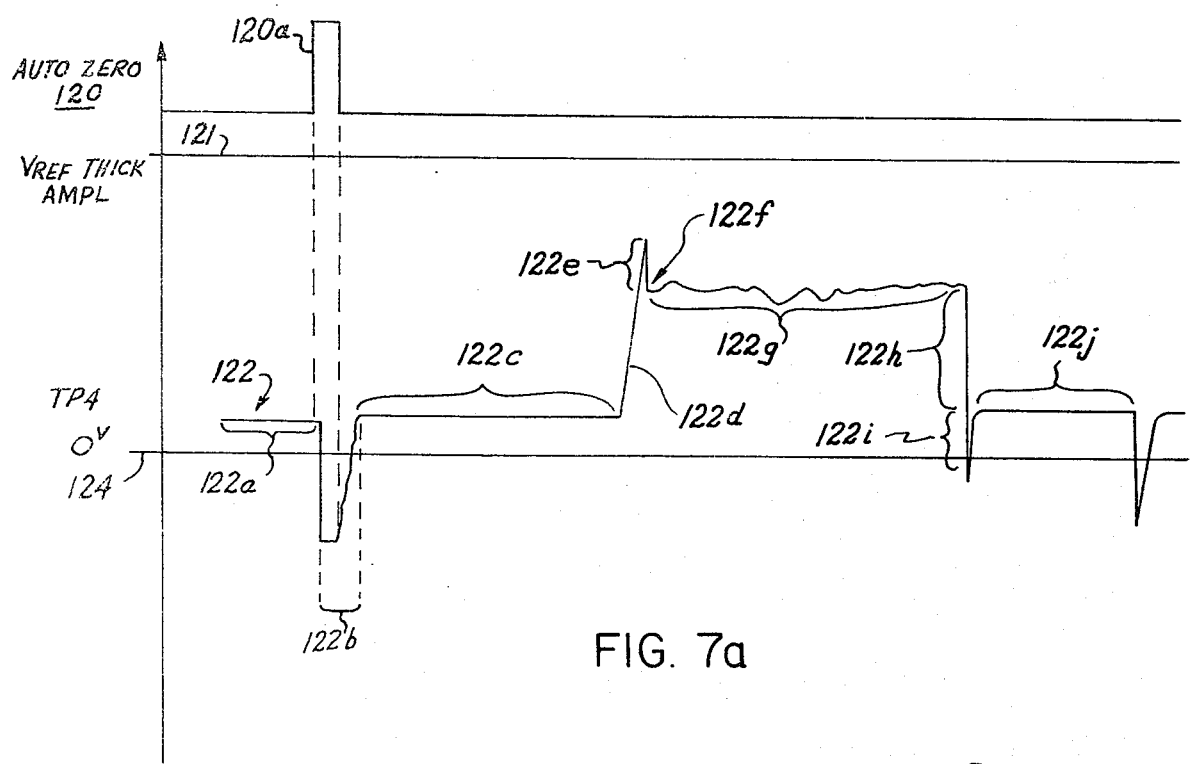
Figure 7B:
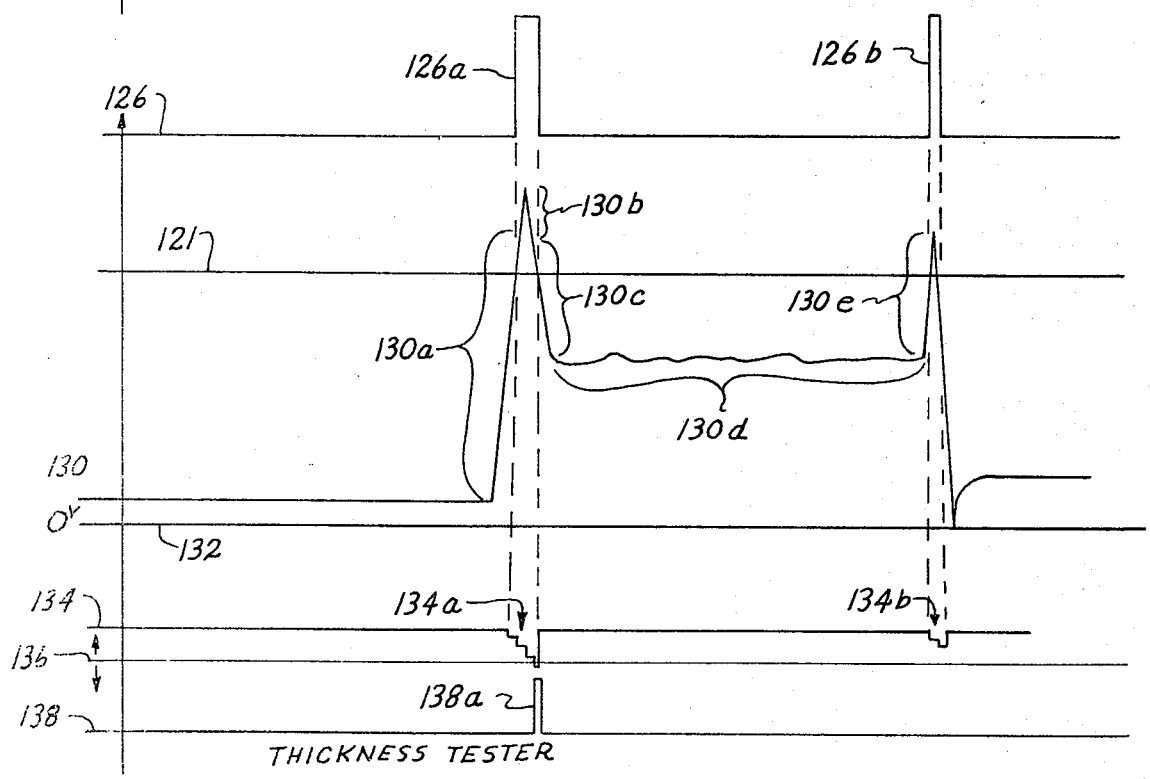

FIGS. 7a and 7b each show a group of waveforms useful in explaining the operation of the present invention.

Figure 5A:
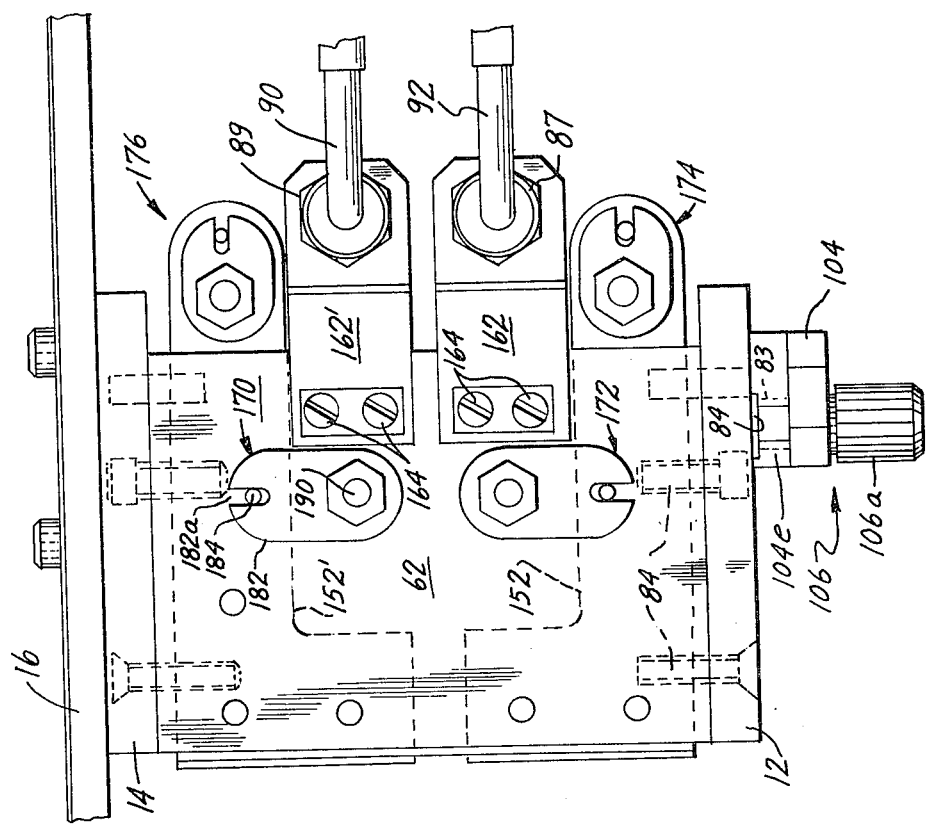
FIGS. 5 through 5c show views of an alternative thickness detector embodiment corresponding respectively to the views shown in FIGS. 1 through 1c.
Figure 5:
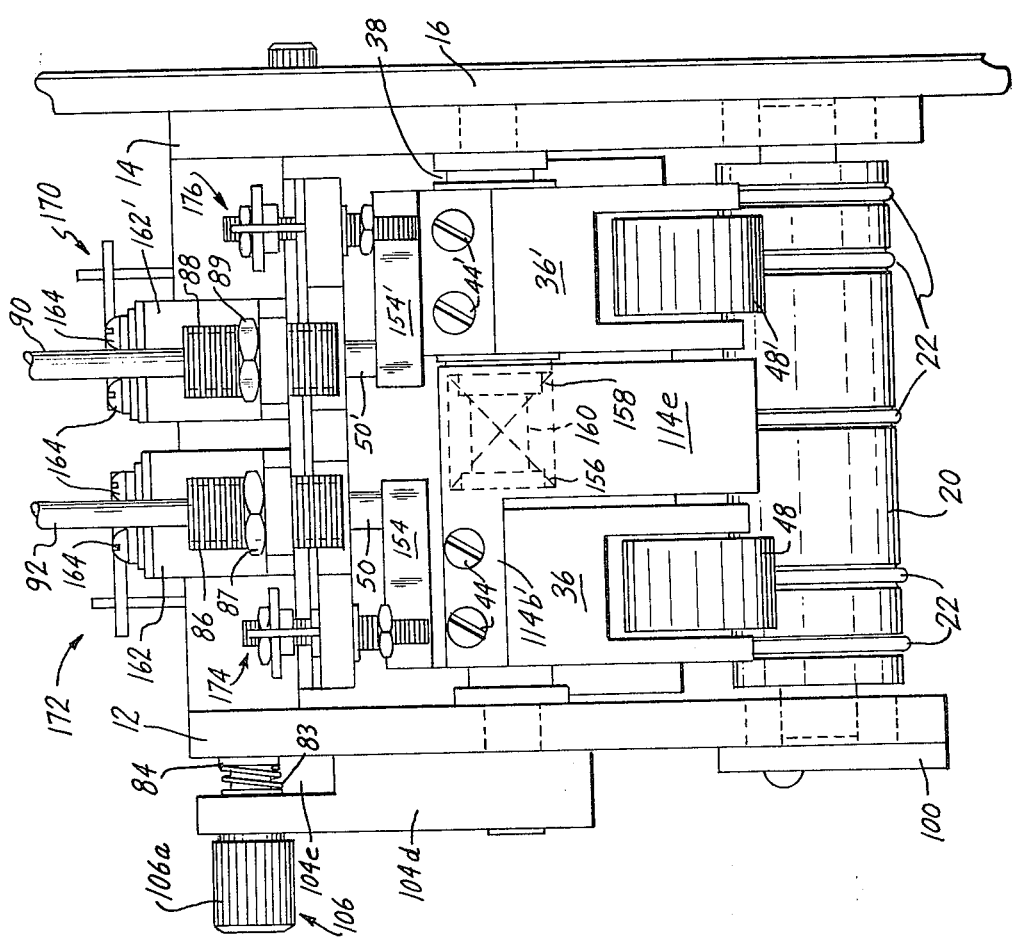

FIG. 6a is a top plan view of one roller assembly shown in FIGS. 5-5c.

FIG. 6b is a partially sectionalized elevational view of the roller assembly of FIG. 6a.

FIG. 6c is a plan view of one of the spring plates of the detector of FIGS. 5-5c.

FIG. 6d is a sectional view of one of the differential adjustment assemblies of FIGS. 5-5c.

Figure 8A:
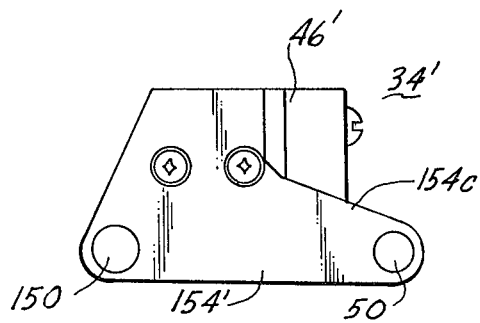

FIG. 8a is a top plan view of one of the pair of roller assemblies shown in FIG. 5.

Figure 8B:
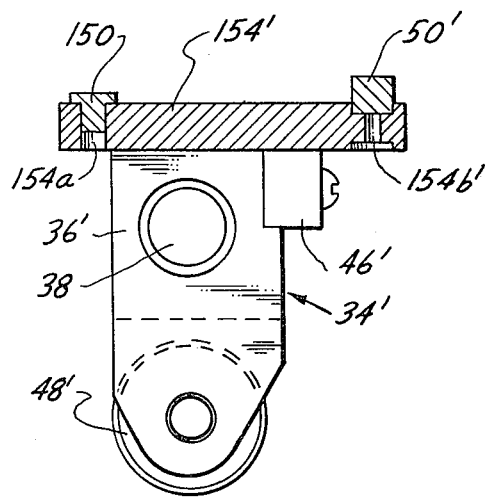

FIG. 8b is an elevational view, partially sectionalized, of the roller assembly of FIG. 8a.

Figure 8C:
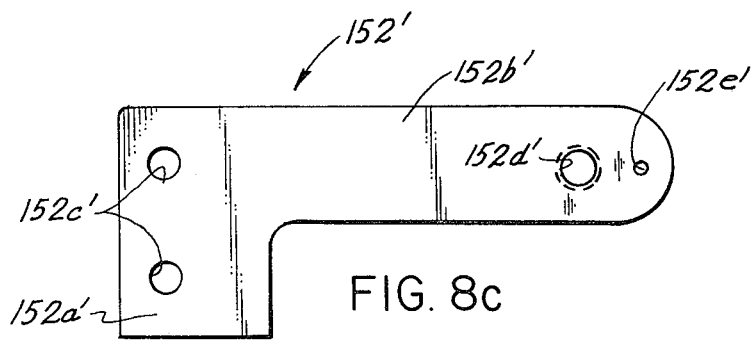

FIG. 8c is a top plan view of one of the spring members shown in FIG. 5c.

Figure 8D:
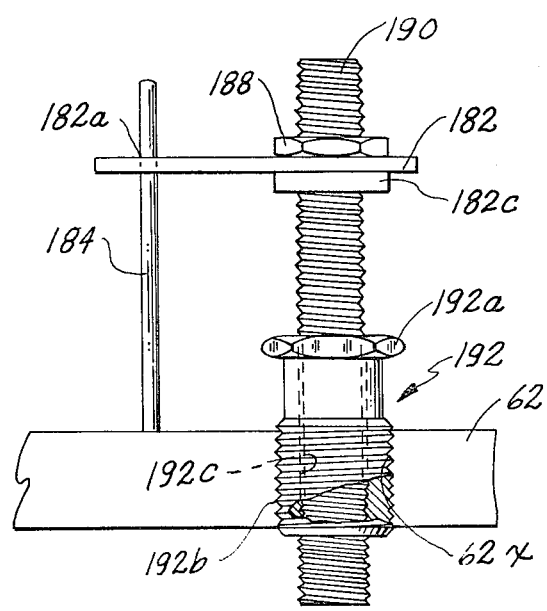

FIG. 8d is an elevational view of one of the adjustment assemblies shown in FIG. 5.

DETAILED DESCRIPTION OF THE INVENTION

The present invention comprises a thickness detection assembly 10 shown in FIGS. 1 through 1c and 2 through 4 which apparatus is extremely advantageous for use in the sheet handling and evaluation apparatus described in copending U.S. applications, Ser. Nos. 188,906 and 188,891, filed on Sept. 19, 1980, and assigned to the assignee of the present invention.

For purposes of understanding the present invention, it is sufficient to understand that the sheet handling and evaluation apparatus described in the aforementioned applications is capable of handling sheets at extremely high operation speeds, and of evaluating said sheets to determine their relativ fitness or unfitness with regard to characteristics such as length, cuts, tears, relative limpness, density, and the like, and based on these evaluations, is further provided with high speed apparatus for directing unfit sheets to a first output stacker and fit sheets to a second output stacker, all of said operations taking place without necessity for either slowing down or halting the handling and evaluation process.

Figure 1:
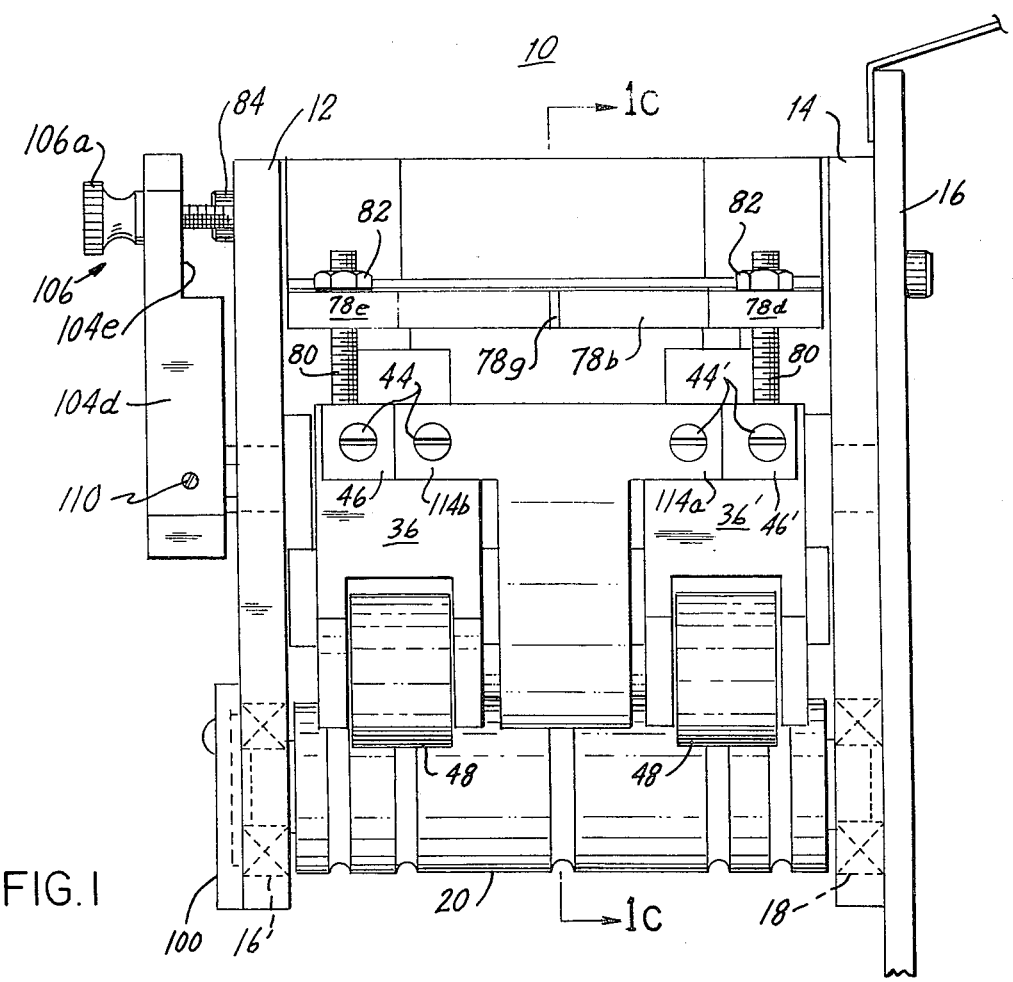
FIG. 1 shows an elevational front view of a thickness detector embodying the principles of the present invention.
Figure 1A:
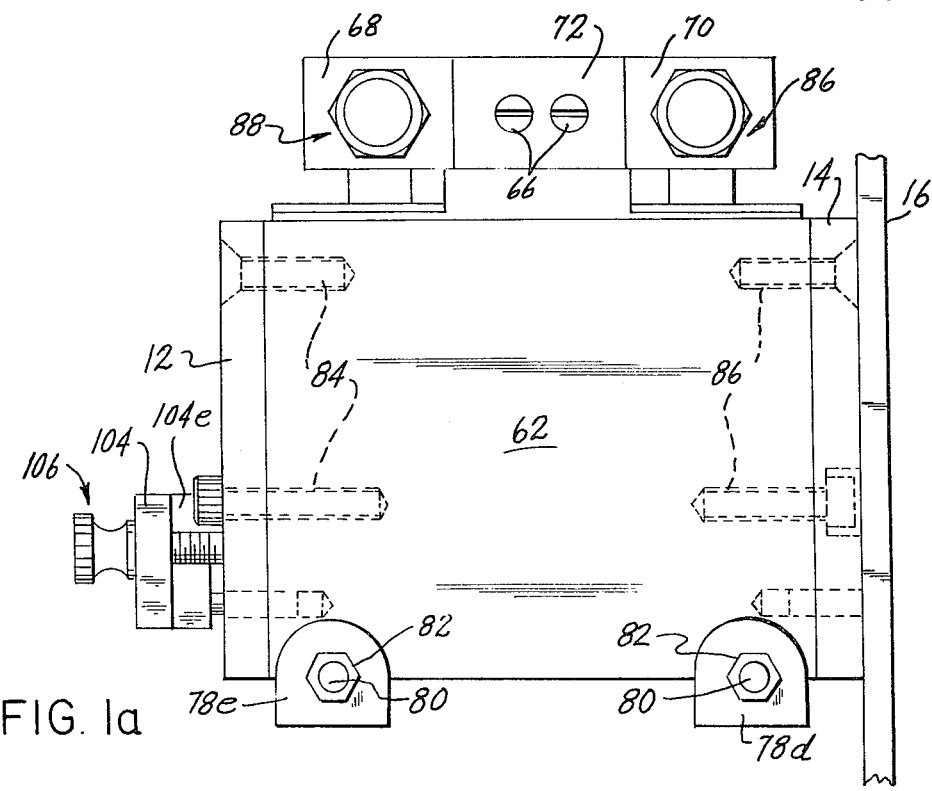
FIG. 1a shows a top view of the thickness detector of FIG. 1.
Figure 1B:
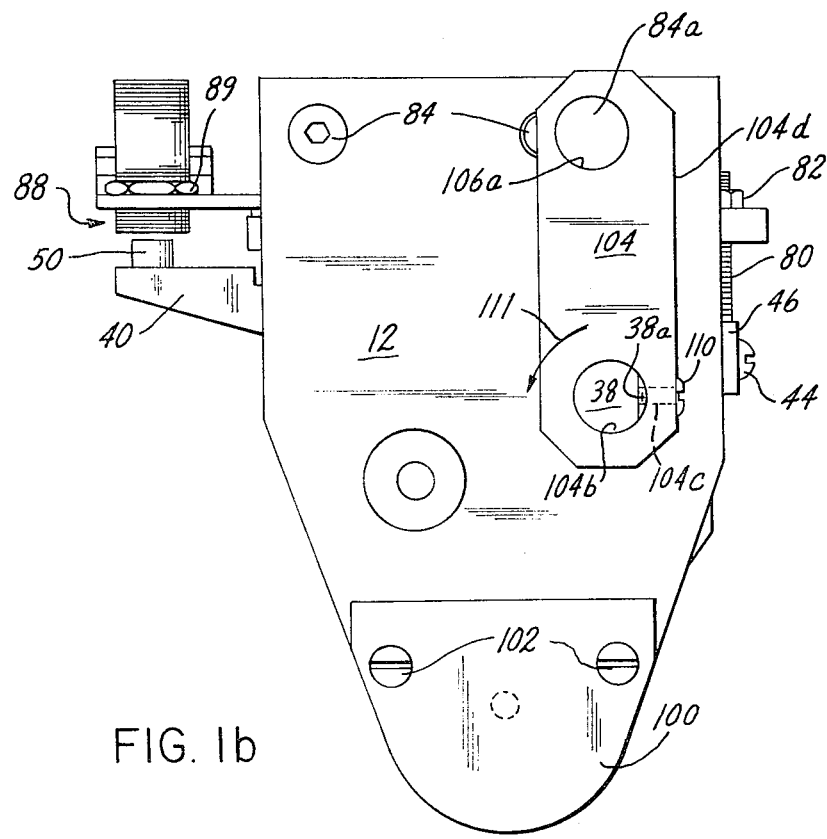
FIG. 1b shows a side elevational view of the thickness detector of FIG. 1.
Figure 1C:
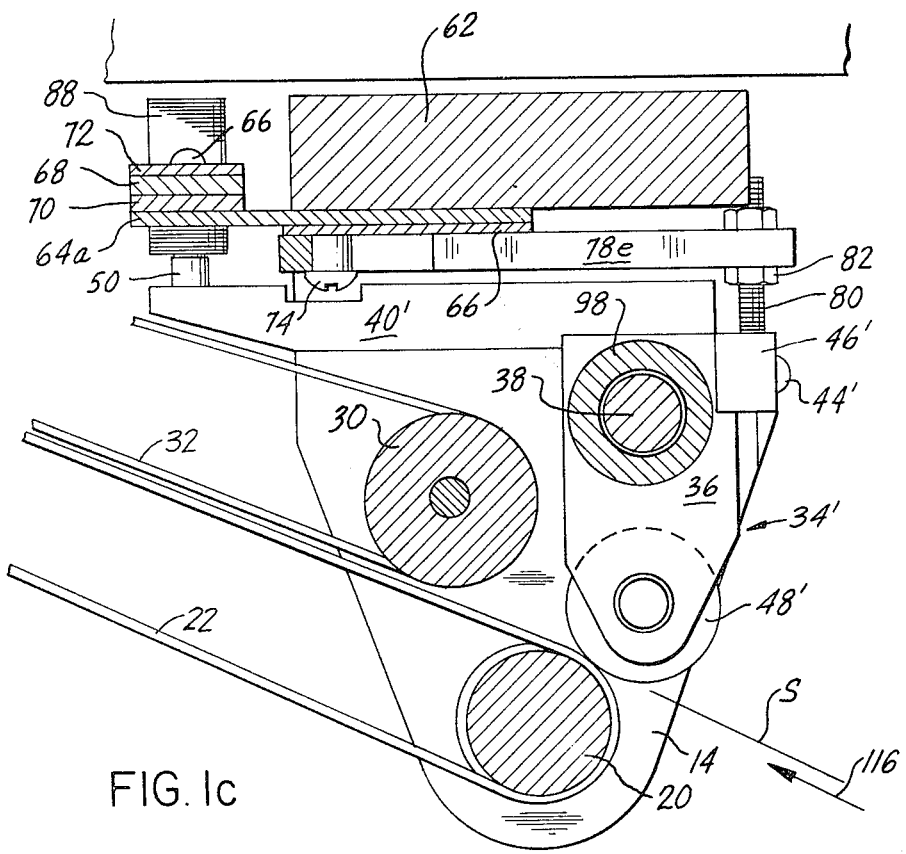
FIG. 1c shows a sectional view of the thickness detector of FIG. 1 looking in the direction of arrows 1c—1c'.
Figure 2:
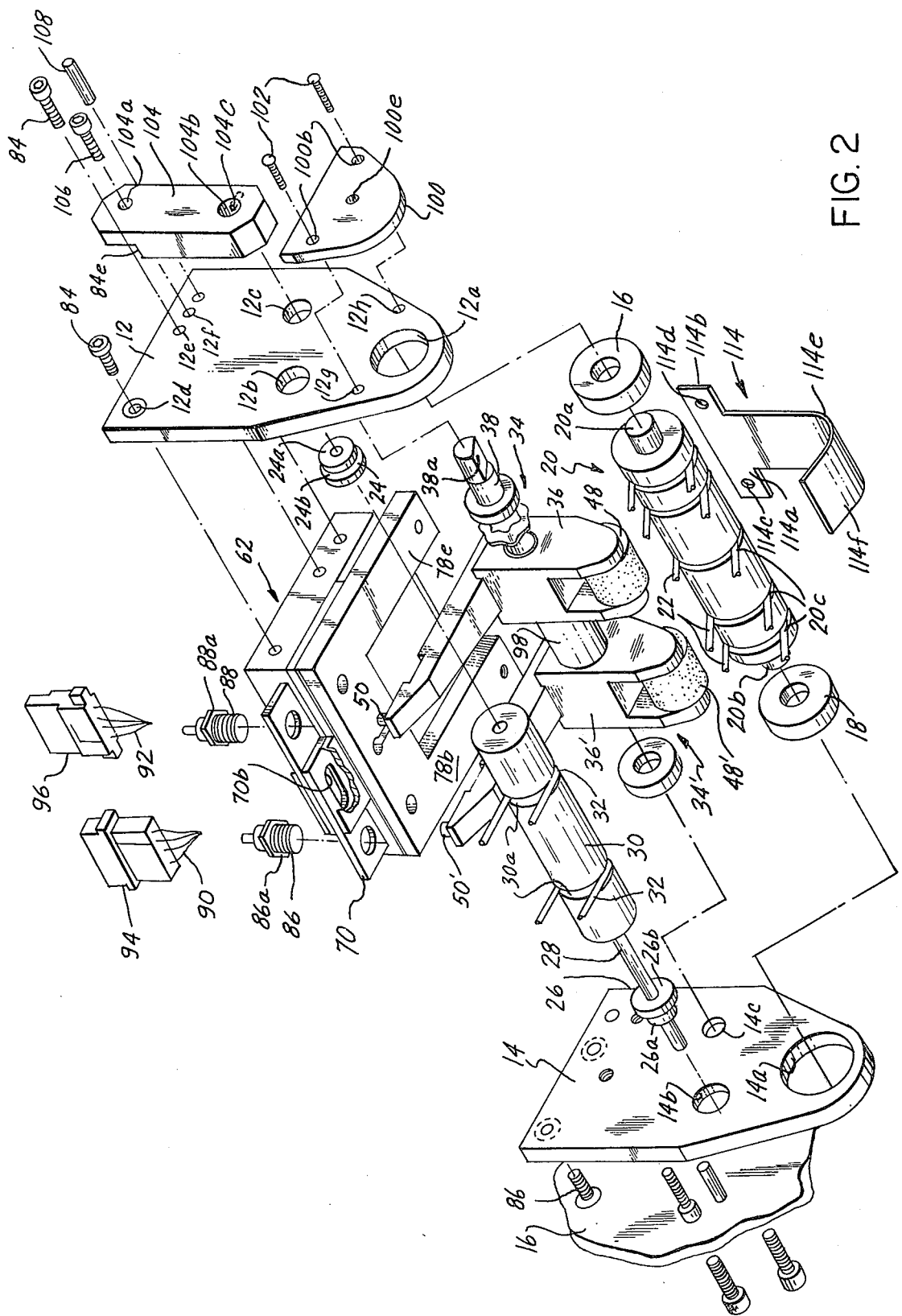
FIG. 2 shows an exploded perspective view of the thickness detector of FIGS. 1 through 1c.

FIGS. 1 through 1c and 2 through 4 show an abnormal thickness detection apparatus 10 comprised of a pair of side plates 12, 14 for supporting the elements of the assembly. Side plate 14 is secured to a stationary frame element 16, only a portion of which is shown in FIG. 2 for purposes of simplicity, for securing the detection apparatus 10 within the document handling and counting apparatus, as will be more fully described.

Plates 12 and 14 are provided with openings 12a, 14a, respectively, for receiving bearings 16, 18 which respectively receive and freewheelingly support the stub shafts 20a, 20b of an enlongated roller 20, which roller is provided with a plurality of annular grooves 20c for receiving and positioning associated O-ring belts 22.

Plates 12 and 14 are further provided with openings 12b, 14b for receiving bearings 24, 26 which freewheelingly support shaft 28, upon which a second elongated roller 30 is mounted. Roller 30 is provided with annular grooves 30a for receiving and supporting associated O-rings 32. O-rings 20 and 32 cooperate to guide sheets which have passed through the folded corner detection apparatus 10, whereupon the sheets are guided to another portion of the sheet handling apparatus for subsequent handling. The folded corner detection apparatus is extremely advantageous for use in the sheet handling apparatus disclosed in copending applications, U.S. Ser. Nos. 188,906 and 188,891, which applications were filed on Sept. 19, 1980 and assigned to the assignee of the present invention. Although the description of the inventions described therein are not necessary for purposes of understanding the present invention, in order to clarify the environment of use of the present invention, sheets, after being examined by the folded corner detection apparatus 10 are typically guided to gating apparatus for gating either to an output stacker for stacking sheets which are "fit" (i.e., have no folded corners) or, alternatively, for gating to a second output stacker for receiving sheets which are "unfit" (i.e., have one or more folded corners).

Plates 12, 14 are further provided with openings 12c, 14c for pivotally mounting a pair of swingable roller assemblies 34, 34'. Since these assemblies are substantially identical in configuration and function, only one such assembly will be described herein in detail for purposes of brevity.

Figure 4:
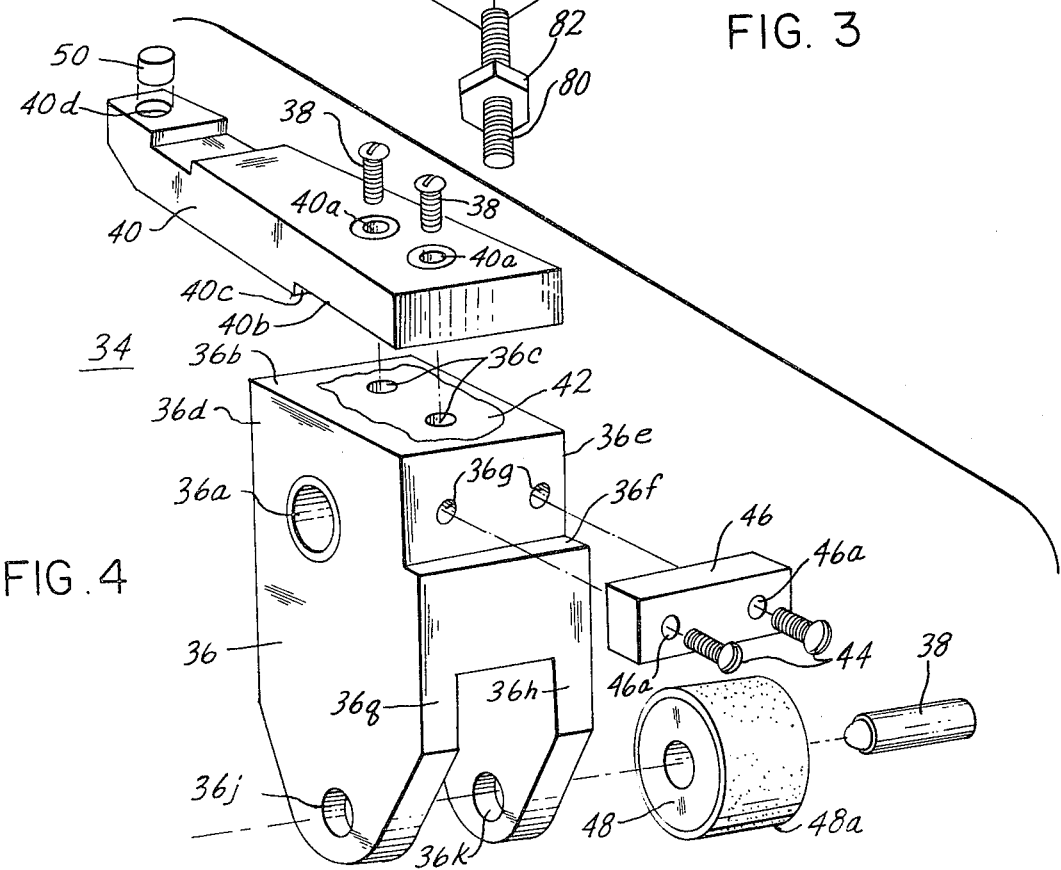
FIG. 4 is an exploded perspective view showing one of the two swingably mounted roller assemblies employed in the thickness detector of FIG. 1.

Noting especially FIGS. 1c, 2 and 4, assembly 34 is comprised of a solid block 36, having opening 36a for receiving shaft 38. Top surface 36b of member 36 is provided with a pair of tapped openings 36c for threadedly engaging threaded fasteners 38, which are arranged to extend through openings 40a in elongated arm 40. The underside of arm 40 is provided with a ledge 40b which is arranged to rest upon surface 36b. Shoulder 40c is arranged to rest against the rear surface 36d of member 36. A suitable epoxy or other like material 42 is deposited upon surface 36b and cooperates with fasteners 38 to secure elongated arm 40 to member 36.

Member 36 is provided with a recessed front surface 36e, whose lower end terminates in a ledge 36f. Tapped openings 36g in recessed surface 36e threadedly engage threaded fasteners 44 which extend through openings 46a in rectangular shaped anvil member 46. Anvil 46 is formed of a tough, rigid material, such as steel, and is designed to be engaged by the lower end of an adjustable threaded member 80, to be more fully described, for adjusting the force exerted upon subassembly 34 by a spring member to be more fully described.

Member 36 is further provided with a pair of downwardly extending, bifurcated arms 36g, 36h which are arranged in spaced parallel fashion and are provided with openings 36j, 36k for receiving and supporting shaft 38, only a portion of which is shown in FIG. 4, for freewheelingly supporting roller 48, having a smooth peripheral surface 48a.

The free end of arm 40 is provided with a circular shaped recess 40d for receiving and supporting a field generating element 50, which may, for example, be a permanent magnet member. Subassemblies 34, 34' are rotatable about shaft 38 independently of one another to facilitate their detection of folded corners, as will be more fully described.

Figure 3:
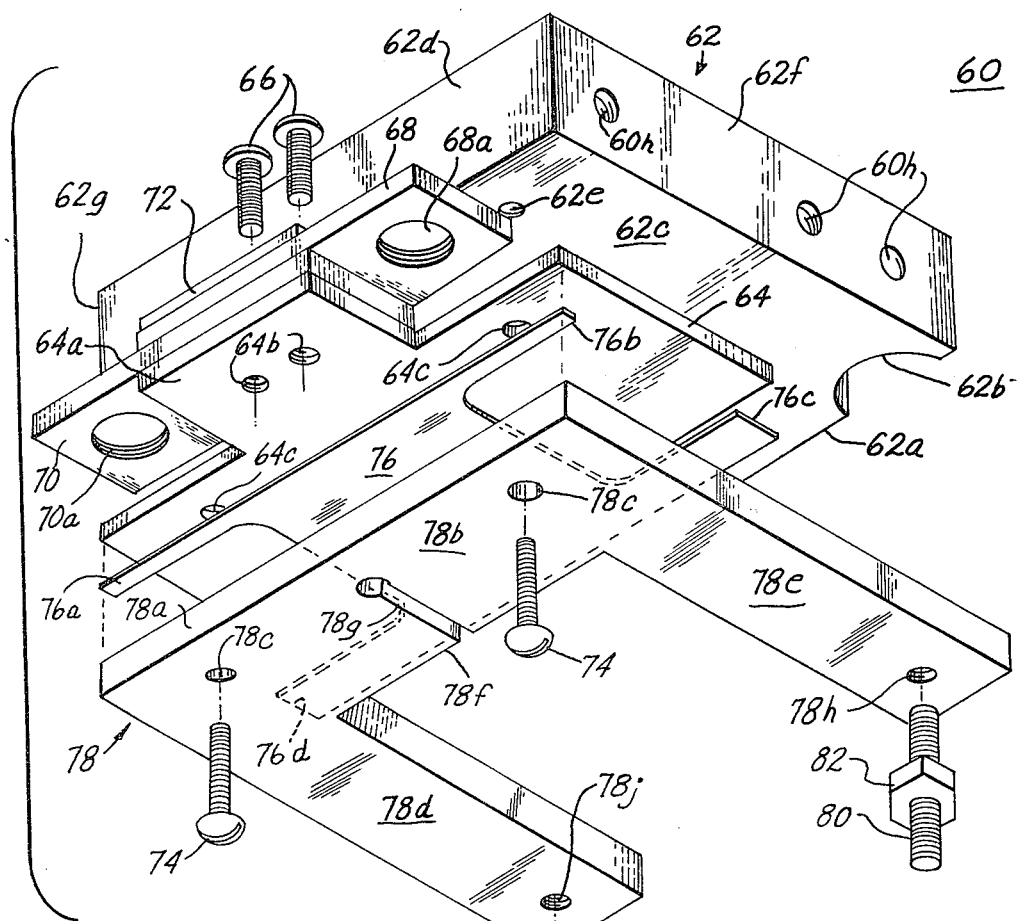
FIG. 3 shows an exploded perspective view of the spring sub-assembly employing the thickness detector of FIG. 1.

The biasing subassembly 60, shown best in FIGS. 1c, 2 and 3, is comprised of a substantially rectangular shaped block 62 provided with a pair of substantially semi-circular shaped recesses along forward edge 62a. Only one such recess 62b is shown in FIGS. 2 and 3. Each of these recesses provide clearance for threaded biasing adjustment members to be more fully described.

A substantially T-shaped plate 64 is positioned beneath member 62 so as to engage bottom surface 62c. Portion 64a of T-shaped member 64 extends beyond the rear surface 62d of member 62 and is provided with tapped openings 64b for threadedly engaging threaded members 66 in order to secure members 68, 70 and 72 thereto.

T-shaped member 64 is further provided with openings 64c for receiving threaded fasteners 72. Threaded fastener 72 extends through openings 64c and threadedly engage tapped openings in member 62. One such tapped opening, 62e, being shown in FIG. 3.

A resilient, substantially H-shaped, metallic sheet 76 is positioned against the bottom surface of T-shaped member 64 and the top surface of biasing member 78. The outwardly extending arms 76a, 76b, 76c and 76d compensate for any warpage of biasing member 78 and assure that the bending of biasing member 76 occurs with respect to known contact points.

U-shaped biasing member 78 has its top surface 78a in engagement with sheet 76. The central portion 78b of U-shaped member 78 is provided with a pair of openings 78c through which threaded fasteners 74 extend. Central portion 78b is further provided with a slot 78g, extending inwardly from edge 78f. Arms 78e, 78d, integral with central portion 78b, are provided with tapped openings 78h, 78j for threadedly engaging threaded members 80, each provided with threaded nuts 82 for adjusting the biasing force exerted upon roller assemblies 34, 34', in a manner to be more fully described.

The block 62 is provided with openings along side surfaces 62f, 62g, the threaded openings 60h being shown in side surface 62f for receiving threaded fasteners 84 (see FIG. 2) to secure side plate 12 to member 62. Side plate 14 is secured to the opposite surface 62g of member 62 in a similar fashion, one such threaded fastener 86 being shown in FIG. 2.

Biasing member 78 is formed of a metallic material, is extremely thick and is yieldable only upon the exertion of a significant force thereto. Elongated slot 79g allows arms 78b, 78e to flex substantially independently of one another and yet to permit these biasing arms to be formed from a single member, thus greatly simplifying manufacture and assembly thereof. Excellent results have been obtained through the use of a plate formed of tempered and hardened steel and having a thickness of 0.25". The length of the resilient arm portion is 2.75 inches.

The portion 64a of plate 64 projecting beyond the rear, vertical surface 62d of solid block 62 is utilized for positioning, supporting and aligning a pair of elongated plates 68, 70, each of which are adapted to receive an associated one of the sensor devices 86, 88, shown in FIG. 2. Plates 68, 70 are each provided with tapped openings 68a, 70a for receiving and threadedly engaging the threaded portions 86a, 88a of sensors 86, 88, respectively. In order to be assured that the sensor elements 86, 88 are properly positioned and aligned above the field generating devices 50, 50' (note FIG. 2), each of the plates 68, 70 are provided with elongated slots to facilitate precise alignment of their openings 68a, 70a over an associated one of the field generating members 50, 50'. FIG. 2 shows a portion of the projection 64a broken away, exposing elongated slot 70b of plate 70. The elongated slot 70b is aligned with the opening 64b and is adapted to have the fasteners 66 extend therethrough. Plate 68 is designed in a manner substantially identical to plate 70. The plates 68 and 70 are appropriately aligned whereupon the fastening elements 66 are tightened to maintain plates 68, 70 in the desired position to assure that sensor elements 86, 88 are retained in precise alignment relative to their cooperating field generating elements 50, 50'. Although the sensor elements 86, 88 and field generating elements 50, 50' may assume a variety of forms, the preferred embodiment of the present invention employs field generating elements 50, 50' in the form of permanent magnet members and utilizes sensor elements in the form of Hall-effect type sensors. FIG. 2 further shows the electrical connections 90, 92 extending from the Hall-effect sensors 86, 88 to electrical connectiors 94, 96 which, in turn, are electrically connected to the circuitry of FIGS. 5 and 6, to be more fully described hereinbelow.

As can best be seen in FIG. 2, the swingable roller assemblies 34, 34' are separated from one another by spacer 98, comprising a hollow, cylindrical member receiving shaft 38, which extends through the hollow center thereof.

The right-hand end of shaft 38 is keyed by providing a flat 38a which is adapted to extend through opening 12c in mounting plate 12 as well as opening 104b in swingable handle member 104. A tapped opening 104c extends from the right-hand side edge 104d and communicates with opening 104b. A set screw 110 threadedly engages tapped opening 104c and bears against flat 38a. The head 106a of threaded fastener 106 is shown in FIG. 1b, whereas threaded fastener 106 extends through opening 104a and threadedly engages tapped opening 12f inside plate 12 to retain swingable lever arm 104 in the vertical position, as shown in FIGS. 1b and 2.

When it is desired to swing rollers 48, 48' away from elongated roller 20 for inspection, maintenance or other purposes, fastening member 106 is removed from tapped opening 12f and lever member 104 is rotated counterclockwise by arrow 110, rotating eccentric shaft 38 counterclockwise and causing the swingable assemblies 34, 34' to move away from roller 20 thereby causing rollers 48, 48' to likewise move away from elongated roller 20 to facilitate inspection, maintenance and/or other objectives. Lever member 104 may be rotated in the counterclockwise direction without interference with fastening member 84 due to the provision of the cut away section 104 along the upper rear surface thereof, as shown best in FIG. 1.

After such inspection and/or maintenance, lever member 104 may then be rotated in the clockwise direction to be returned to the vertically upright position shown in FIG. 1b, whereupon fastening member 106 is returned to its original position in threaded engagement with tapped opening 12f and is tightened sufficiently to retain lever member 104 in this position.

Plate 100, which is secured to plate 12 by means of the tapped openings 12g, 12h and threaded members 102 which extend through openings 100b in plate 100, serves to retain the bearing 16 in position between the right-hand end of elongated roller 20 and plate 100.

Bearings 24, 26 are retained in a position between plates 12, 14 by virtue of their stepped configuration, so that the narrow diameter portions 24a, 26a extend into respective openings 12b, 14b, while the larger diameter portions 24b, 26b rest against the marginal portion of plate surfaces 12, 14, surrounding openings 12b, 14b.

A paper guide 114, having a substantially J-shaped configuration is provided with a pair of outwardly extending mounting portions 114a, 114b, each having an opening 114c, 114d for receiving fasteners 116 (see FIG. 1) to secure paper guide 114 to the bifurcated members 36, 36', whereby each of the arms 114a, 114b overlie a portion of the front surfaces of anvils 46', 46, shown best in FIG. 1.

Paper guide 114 is substantially flat and extends downwardly over a significant portion of its length and is curved at 114e so that its free end 114f extends diagonally upward and into the space between rollers 48 and 48'. Paper guide 110 serves as a means to prevent torn edges or corners of skewed sheets from becoming wedged or jammed between the swingable roller assemblies 34, 34' to assure smooth and efficient feeding of paper sheets.

The operation of the folded corner detection means is as follows:

Sheets, such as, for example, sheet S (see FIG. 1), are delivered to the apparatus 10, as shown best in FIG. 1c, and is moving in the direction of arrow 116. The sheet moves between the wingably mounted rollers 48, 48' and the roller 20. The single thickness sheet causes rollers 48, 48' to be urged away from roller 20, whereupon assemblies 34, 34' are caused to rotate counterclockwise about shaft 38 through a small angle causing the free end of arms 40, 40' to be slightly displaced from their normal position causing permanent magnet members 50, 50' to be slightly displaced from their associated sensor elements 86, 88. These sensor elements develop electrical signals whose magnitudes are a function of the separation distance between the sensors 86, 88 and their associated permanent magnet members 50, 50', this change in signal strength being due to a change in the field strength detected by sensors 86, 88 as a result of the displacement of the permanent magnet members from their positions in close proximity to sensor elements 86, 88 during the time that no sheets are passing between roller 20 and rollers 48, 48'. The change in the signal is increased by providing arms 40, 40' with a length which is more than double the distance from that axis of shaft 38 to the axis of rollers 48, 48'.

In the embodiment of FIGS. 1—1c, sheets are moving at a linear velocity in excess of 100 inches per second. As a result, when the leading edge enters between roller 20 and rollers 48, 48', the rollers 48, 48' abruptly move away from roller 20. The biasing arms, however, prevent assemblies 34, 34' from experiencing large angular displacements due to "overshoot", while permitting the angular displacements of assemblies 34, 34' to accurately track sheet thickness, thereby limiting the swing and amplitude of the signals developed by sensors 86, 88 to faithfully reproduce the profile of the passing sheet.

This is also true when the sheet presently being fed between roller 20 and rollers 48, 48' passes downstream so that its trailing edge is moved out of engagement with said rollers, whereby undershoot is significantly attenuated.

Rollers 48, 48', under the influence of the strong biasing forces of arms 78d, 78e are abruptly returned to their normal position. However, due to the extremely strong biasing forces exerted upon the swingable assemblies 34, 34', these assemblies do not experience any measureable "bounce" and settle to a steady state rest condition substantially instantaneously, again significantly reducing the signal developed by the sensor elements 86, 88 as a sheet moves out from between roller 20 and rollers 48, 48'.

The above operation is also obtained when sheets having one or more folded corners at both leading and trailing edges are encountered by roller 20 and one or more of the rollers 48, 48', as well as abnormal thickness conditions encountered at points between the leading and trailing edges of the sheet.

When a folded corner passes through the detection apparatus, for example when a folded corner passes between roller 20 and roller 48', the displacement of swingable assembly 34' is substantially double the displacement experienced by swingable assembly 34' when a single sheet, having no folded corners, passes between roller 20 and roller 48'. The bias plate, however, permits swingable assembly 34' to faithfully and accurately track the folded corner condition, while significantly attenuating the displacement of assembly 34' due to overshoot. The same result is obtained when a folded corner passes out from between rollers 20 and 48'.

FIGS. 5 through 5c, 8a through 8d, show another alternative thickness detector 10' in which like elements are designated by like numerals as between FIGS. 1–1c and FIGS. 5—5c. The description of the embodiment 10' will be limited to the differences as between alternative embodiment 10' and the first embodiment 10, shown in FIGS. 1 through 1c, 2, and 3, for the sake of brevity.

Figure 6:
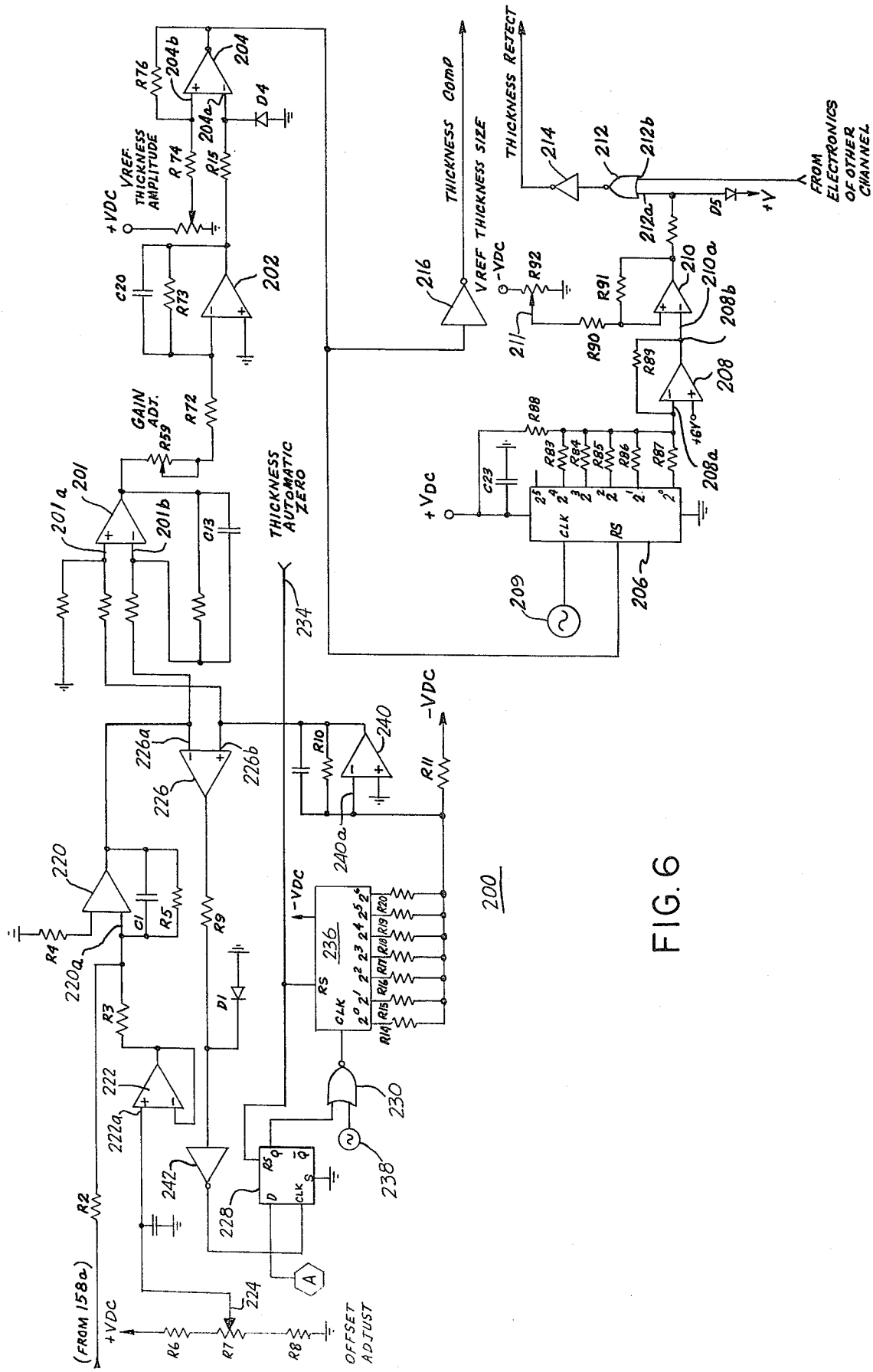
FIG. 6 shows a schematic diagram of the circuitry employed for providing automatic compensation for temperature changes of the sensors provided in the thickness detector of FIG. 1 and for developing reject signals in the presence of folded corners and/or other like conditions.

The pair of displaceable assemblies 36 and 36' which support rollers 48 and 48' and field generating elements 50 and 50' respectively, are each provided with an arm 154, shown best in FIGS. 8a and 8b, which extends in a direction to the right of the shaft 138, as shown in FIG. 6, in contrast to the arm 40 shown, for example, in FIG. 4 which extends to the left of shaft 38. Compare also arm 40' shown in FIG. 1c. Arm 154 has a tapered side 154c to expose the top of anvil 46' which is engaged by an elongated, threaded member forming part of differential adjustment assembly 176, to be more fully described hereinbelow. The elongated threaded member, however, performs substantially the identical function of elongated threaded member 80, shown in FIG. 1c, which serves to regulate the biasing force exerted by alternative biasing member 152' upon the displaceable assembly 34', shown in FIGS. 8a and 8b.

Arm 154 is provided at its left-hand end with an opening 154a for receiving and supporting a wear button 150, which is engaged by elongated threaded member 190, as shown in FIGS. 5a, 5c and 8d. Wear button 150 is preferably formed of a case-hardened steel for reducing the wear experienced by assembly 34'. The anvil 46' functions to reduce wear in a similar fashion.

The right-hand end of arm 154' is provided with an opening 154b which receives permanent magnet member 50'. The permanent magnet member 50' cooperates with sensor element 88, shown in FIGS. 5a and 5c. Sensor 88 is adjustable to adjust the strength of the signal developed by sensor 88 as a function of the displacement distance between sensor 88 and magnet 50', and its outer surface threadedly engages a tapped opening provided in a Z-shaped support bracket 162' whose upper arm is fastened to member 62 and whose lower arm receives and adjustably supports Hall-effect type sensor 88. Nut 89 is tightened against the lower arm of Z-shaped support 162' to lock the sensor 88 to the adjusted position relative to permanent magnet member 50'.

The assemblies 36 and 36', mounted upon common shaft 38, are urged apart from one another by spring 160 which surrounds shaft 38 and urges spacer buttons 156 and 158 respectively against assemblies 36 and 36'. Spring 160 prevents the axial displacement of assemblies 36, 36' to assure proper alignment of the sensors 88, 86 relative to the magnets 50', 50.

The thin, flexible guide membe 114' is substantially identical to the guide member 114 of embodiment 10, except that only as single support arm 14b' is utilized to secure the guide member 114' to assembly 36. Thus, arm 114a, utilized in the embodiment 114 shown in FIG. 2, is omitted from the member 114'.

Embodiment 10' utilizes two separate and independent biasing members 152 and 152', shown best in FIG. 5a, one of which is shown in detail in FIG. 8c. Member 152' shown in FIG. 8c is provided with an elongated arm portion 152b' and a short arm portion 152a' and openings 152c' receive threaded fasteners such as, for example, threaded fastener 153 shown in FIG. 5c, which threadedly engages tapped opening provided in block 62. Members 76 and 64' are positioned between spring member 152', member 76 being substantially identical to the substantially H-shaped sheet 76, shown best in FIG. 3, while member 64' is substantially the same as member 64, shown in FIG. 3, except that the projection 64a, utilized to support the sensor elements 86 and 88, has been omitted in the embodiment 64' shown in FIG. 5c.

The adjustment assembly 182 shown best in FIGS. 5a, 5c and 8d, is utilized to control the separation distance between roller 48' and roller 20. The adjustment assembly 176, also shown in FIGS. 5a and 5c, is utilized to control the biasing force exerted by member 152' upon displaceable assembly 34'. As was described in detail hereinabove, when a sheet enters between rollers 20 and 48', assembly 34' swings counterclockwise about shaft 38 as shown by arrow 190 in FIG. 5c. When trailing edge of a sheet passes beyond rollers 20 and 48', biasing member 152, whose biasing force is exerted upon assembly 34' through threaded member 199, which rests upon the upper surface of anvil 46', urges assembly 34' to swing clockwise about shaft 38. However, this clockwise movement is limited by the positioning of adjustment assembly 170. Adjustment assemblies 172 and 174 function in a manner similar to the adjustment assemblies 170 and 176. Each of the adjustment assemblies 170–176 are differential type adjustment assemblies, and since their design and function are substantially identical, only the adjustment assembly 170 shown in detail in FIGS. 5c and 8d will be described in detail, for purposes of simplicity.

Adjustment assembly 170 is comprised of elongated threaded member 190 and shorter threaded member 192 whose outer periphery is threaded at 192b to threadedly engage a tapped opening 66x provided in block 62. The center 192c of threaded member 192 is hollow and is tapped to threadedly engage the lower end of elongated threaded member 190. The upper end of threaded member 192 is provided with a nut-like gripping portion 192a.

An oval-shaped member 182 is provided with a clearance opening 182b. A tapped member 182c is integrally joined to the underside of member 182, so that its tapped opening is coaxially aligned with clearance opening 182b. A narrow slot 182a is provided at one end of member 182 for slidably receiving and embracing an elongated pin 184 whose upper end extends through slot 182a and whose lower end is secured within a suitable opening provided in block 62.

The pitch of threads provided about the outer periphery of member 192, is 28, i.e., 28 threads to the inch, so that when member 192 is rotated through one complete revolution, it moves an axial distance of 1/28th inches. The pitch of elongated threaded member 190 and the cooperating pitch of the tapped opening 192b of member 192 is 32, i.e. 32 threads to the inch, so that when member 190 rotates through one full revolution, it moves an axial distance of 1/32nd inches. The sense of threads on the inner and outer peripheries of member 192 are reversed. The operation of the differential adjustment means 170 is as follows:

Threaded nut 188 is firmly secured against the upper surface of member 182 to prevent elongated threaded member 190 from rotating about its axis of rotation. Let it be assumed that the desired adjustment requires that the lower end 190a of elongated threaded member 190 be moved downwardly. To accomplish this, a tool, such as a wrench, is placed about gripping portion 192a of member 192 to rotate member 192 in the direction shown by arrow 193, causing member 192 to move downwardly as shown by arrow 195. The interior threaded portion of member 192 is also rotating at this time and, since it threadedly engages elongated threaded member 190, which is not free to rotate about its axis of rotation, since sense of the threads 192b of threaded member 190 is reverse the sense of the threads of threaded member 190, threaded member 190 moves upwardly in the direction shown by arrow 197. However, since the pitch of member 192 is such that it moves a greater axial distance per single revolution relative to the pitch of member 190, the overall result is that, although member 192 moves downwardly and member 190 moves upwardly, member 190 moves a smaller axial distance than member 192, whereby the resultant effect is that the lower end 190a moves downwardly.

Assuming that member 192 has been rotated through one full revolution, as a result, it will move axially downward through a distance of 1/28th inches, while at the same time, member 190 moves upwardly a distance of 1/32nd inches. The result is that the lower end 190a of member 190 moves downwardly a distance of 1/224th inches, providing an extremely fine differential adjustment.

To obtain a coarse adjustment, nut 188 need only be loosened, permitting member 190 to be moved independently of member 192, whereupon either member 190 or member 192 may be adjusted upwardly or downwardly to effect a coarse adjustment. Once nut 188 is tightened, the fine differential adjustment may then be obtained. The elongated pin 184 which extends through slot 82a allows member 182 to move freely either upwardly or downwardly, while preventing member 182 to experience any rotational or swingable movement about the longitudinal axis of threaded member 190. If desired, the pitches and/or senses of members 190 and 192 may be reversed to enable member 190 to move through a greater axial distance than member 192 and to move in opposite directions.

The assemblies 172, 174 and 176 function in a manner substantially identical to the differential adjustment means 170.

The embodiment 10', employs arms 154 and 154' in each displaceable assembly 34 and 34', respectively. To significantly reduce the "noise" signal superimposed upon the sensing signal, which "noise" signal is due to the undesirable vibration of the displaceable assemblies 34 and 34', the length of arms 154, 154' is reduced substantially as compared with the length of arms 40, 40' of FIG. 2. The reduction in arm length, i.e. the displacement distance of the field generating elements 50 and 50' relative to the shaft 38 about which the assemblies 34 and 34' swing, is substantially compensated for by either increasing amplification of the sensor signal or by providing an additional stage of amplification of the signals developed by sensors 86, 88. The biasing spring 160 substantially prevents the displaceable assemblies 34, 34' from experiencing lateral movement, thus preventing the field generating elements 50 and 50' from shifting laterally, relative to their cooperating sensing elements 86 and 88, further reducing degradation in the displacement signal.

FIGS. 7a and 7b each show a group of waveforms useful in explaining the signals developed by the sensors 86, 88 employed in the folded corner and at normal thickness detection apparatus.

Waveform 122 shows the signal developed by one of the sensors such as for example 86. Portion 122c of waveform 122 constitutes the level of the signal developed by sensor 86 at a time when no sheets are passing between rollers 20 and 48'. As the leading edge of a sheet moves between rollers 20 and 48', the voltage level of sensor 86 changes at a rapid rate due to the abrupt movement of the leading edge of a sheet between rollers 20 and 48'. The assembly 34' experiences some overshoot as represented by waveform portion 122e. The amount of overshoot is severely limited due to the strong spring force exerted against assembly 34' by arm 78e of member 78. It can be seen from portion 122f of waveform 122 that the assembly 34' settles rapidly after experiencing the aforementioned overshoot due to the significant biasing force exerted by arm 78e upon assembly 34'. Portion 122g of waveform 122 represents deviations in the displacement between permanent magnet member 50' and sensor 86 as a result of changes in the thickness in the sheet passing between rollers 20 and 48' which may be due to folds, creases, dirt or other foreign matter on the sheet or, alternatively, foreign material affixed to the sheet such as a sheet of paper, adhesive tape or the like, as well as irregularities in the sheet itself. In fact, the tracking is so accurate that the deviations in signal amplitude represent the deviation in thickness due to the ink pattern on the paper currency.

As the trailing edge of the sheet passes out from between rollers 20 and 48', the signal developed by sensor 86 abruptly decreases as shown by waveform portion 122h. The abrupt removal of the trailing edge from between rollers 20 and 48' causes a certain amount of undershoot as represented by waveform portion 122i which is severely limited due to the strong biasing force exerted upon assembly 34' by arm 78e. The arm 78e rapidly restores the assembly 34' to the rest condition almost instantaneously and without further overshoot as can be seen from portion 122j of waveform 122.

The signals developed by sensors 86, 88 are maintained at a proper signal level which is adjusted subsequent to passage of the trailing edge of a sheet and prior to receipt of the leading edge of the next sheet by an automatic zero control amplifier.

The folded corner and abnormal thickness detection circuitry 200 shown in FIG. 6 comprises the circuitry employed for use with sensor 86, for example, it being understood that circuitry substantially identical to the circuit 200, shown in FIG. 6 is provided for the remaining sensor 88. Since these circuits are substantially identical in both design and function, only one such circuit 200 will be described herein for purposes of brevity.

The output of sensor 86 is coupled to input 220a of operational amplifier 220 which input is further coupled to the output of operational amplifier 222 through resistor R3. Input 222a of operational amplifier 222 receives a reference level signal whose level is established by potentiometer R7 whose adjustable arm 224 is coupled to input 222a.

As was mentioned hereinabove, sensor 86 is a Hall-effect type sensor whose output signal is affected by changes in ambient temperature. Thus, in order to greatly enhance the sensitivity and accuracy of the sensing signal, it is imperative to compensate as fully as possible for the effect of ambient temperature upon the output of sensor 86. To partially accomplish this, a potentiometer R7 is adjusted to obtain as close to a zero offset as is possible. The output of operational amplifier 222 is mixed with the signal derived from sensor 86 at input 222a of operational amplifier 222.

The sensor signal which has been adjusted by an offset signal in the manner described hereinabove, is applied to input 226a of comparator 226. The remaining input 226b of comparator 226 is coupled to amplifier 190.

An automatic offset adjustment is made to precisely offset the effect of ambient temperature upon the sensor at a time prior to the movement of the leading edge of the next sheet into the folded corner detection apparatus 10. This signal is applied to the reset input RS of bistable flip-flop 228 causing its Q output to go low and enabling gate 230 to pass pulses from pulse source 238. The thickness automatic zero signal, appearing on line 234, is also simultaneously applied to reset input RS of counter 236, causing all of the output stages $2^0$ through $2^6$ to be reset to zero. Upon termination of the thickness automatic zero pulse, pulses derived from pulse source 238 are applied to the clock input CLK of counter 236 whereupon selected stages each of counter 196 apply a current of a predetermined magnitude through an associated current limiting resistor R14 through R20 to develop a signal at input 240a of operational amplifier 240 which is a function of the sum of the IR drops across each of the resistance branches R14 through R20. The values of resistors R14 through R20 is such that each resistor has an ohmic value which is double that of the resistor to its left. For example, resistor R15 has an ohmic value double that of resistor R14; resistor R16 has an ohmic value which is double that of resistor R15 and so forth. The signal applied to input 226b is a negative staircase signal whose magnitude is compared against the magnitude of the sensor signal by comparator 226. As soon as the signals compare, comparator 226 develops an output which is inverted by inverter 242 to develop a clock level signal causing the Q output to go high, thereby preventing gate 230 from passing any further pulses from pulses source 196.

The output of operational amplifier 240 is also coupled to input 201a of amplifier 201. Input 201b is coupled to the output of amplifier 220. The result of the aforementioned comparison operation yields an offset signal at the output of amplifier 240 which is subtracted from the output of amplifier 220 so that the coarse offset provided by potentiometer R7, coupled together with the fine offset signal developed by counter 236 and associated resistors R11 and R14 through R20, collectively cooperate to provide a composite offset signal which substantially fully compensates for and thereby nulls the effect of ambient temperature upon the Hall-effect device 86. Adjustments are made on a regular, periodic basis during the interval in which no sheets are passing through the folded corner and abnormal thickness detection apparatus 10, assuring that both gradual and/or abrupt changes in the output signal of the sensor 86 due to changes in ambient temperature are fully and instantaneously compensated for during the measurement of the next sheet. This operation is repeated prior to the examination of each sheet.

Considering FIG. 7, the auto zero adjust signal is shown by waveform 120 whereupon when pulse 120a is applied to line 234 and the magnitude of the signal is adjusted at this time as shown by waveform portion 122b of waveform 122.

The signal developed by sensor 86 which has now been appropriately amplified and for which a compensation signal has been developed to account for any changes in signal level due to ambient temperature, undergoes further amplification by amplifier 202 whereupon the amplified signal is applied to input 204a of comparator 204 whose input 204b receives a voltage reference representing the thickness amplitude for a thickness which is slightly greater than the thickness of a sheet and less than the thickness of two sheets or a folded corner for example. See waveform 121.

When the level of the sensor signal applied to input 204a exceeds the voltage reference thickness amplitude signal represented by waveform 121 in FIG. 7a, the output level of comparator 204 removes a reset condition from the reset input RS of counter 206 enabling timing pulses from timing pulse source 209, which are applied to the clock input CLK of counter 206, to cause counter 206 to count up from zero.

The output stages $2^0$ through $2^4$ of counter 206 change their binary state in a predetermined fashion causing the resistors R83 through R87 and R88 to develop a positive staircase signal at input 208a of operational amplifier 208, as long as the signal level applied to input 204a of comparator 204 exceeds the aforementioned threshold level. Noting FIG. 7b, for example, when waveform 130 exceeds the threshold level represented by waveform 121, comparator 204 develops an output pulse 126a forming part of waveform 126. At this time, counter 206 begins to receive pulses from source 209 to develop a negative staircase signal represented by waveform portion 134a of waveform 134.

The negative staircase signal developed at output 208b of operational amplifier 208 is applied to one input 210a of comparator 210 whose other input is coupled to a voltage reference thickness size source preferably comprised of a potentiometer and representing the length of a folded corner condition, for example. This voltage reference thickness size is represented by waveform 136 in FIG. 7b.

As soon as the negative staircase signal 134a drops below the aforementioned reference level represented by waveform 136, comparator 210 develops an output signal represented by a positive pulse shown as waveform portion 138 of waveform 138, which represents a double thickness condition that has persisted for a period of time sufficient to represent the presence of a folded corner condition of significant length to warrant the sheet presently passing through the folded corner detection apparatus 10 as being unfit. Thus, the output of comparator 210 is passed by gate 212 and inverter 214 to develop a thickness reject signal. The reference level 136 is adjustable to control the size of fold that will be tolerated before generating a reject signal.

Gate 212 has its one input 212a coupled to the output of comparator 210 and its other input 212b arranged to receive a signal from the output of a comparator substantially identical to comparator 210 and employed in the thickness detection circuitry for sensor 88.

The detection of a thickness condition of double thickness or folded corner by comparator 204 is coupled to inverter 216 whose output develops a thickness compare signal to indicate the presence of a double thickness for subsequent use and evaluation, such as for example, for use by the microprocessor described in the aforementioned copending U.S. Application Ser. No. 188,891.

Summarizing the operation of the present invention, the sheets to be examined for folded corners are delivered to the folded corner detection apparatus 10. Considering a sheet having no folded corners, as represented by waveform 122 in FIG. 7a, as the leading edge of the sheet enters into the region between roller 20 and rollers 48, 48', the sensor signals abruptly change as represented by waveform portion 122d. Some overshoot is experienced as represented by waveform portion 122e. The roller assemblies 34, 34' are rapidly returned from the slight overshoot condition due to the forces imparted to assemblies 34, 34' by the arms 78d, 78e. The remainder of the time that the sheet passes between roller 20 and rollers 48, 48', the rollers 48, 48' closely and accurately track the thickness of the sheet across its length.

As the trailing edge passes beyond roller 20 and rollers 48, 48', this abrupt change is indicated by waveform portion 122h. Some undershoot is experienced as indicated by waveform portion 122i. However, it can be seen that the roller assemblies 34, 34' are abruptly returned to the normal position as represented by waveform portion 122j.

The effect of the spring forces exerted upon assemblies 34, 34' enable the voltage reference thickness amplitude represented by waveform 121 to be located in relatively close proximity to the waveform representing a sheet. If the assemblies 34, 34' were to experience significant overshoot, waveform portion 122e would exceed reference amplitude level 121, yielding an erroneous indication of the presence of a double thickness sheet. Shifting of the voltage reference level as represented by waveform 121 would yield further erroneous results since the level as shown in FIGS. 7a and 7b represents actual double thickness translated into a voltage level.

Waveform 130 shows a condition where a sheet has both a leading edge and a trailing edge folded corner or at least a significant change in thickness due to whatever reason. Similar to the example given hereinabove, and after adjustment of the offset signal, as the leading edge enters between roller 20 and rollers 48, 48', at least one of these rollers will be displaced due to the double thickness condition resulting in the abrupt change in the sensor signal as represented by waveform portion 130a. Waveform portion 130b represents the portion of the signal which results due to overshoot. It can be seen that due to the presence of a double thickness condition, the signal exceeds the threshold level as represented by waveform 121. This causes comparator 204 to generate a signal represented by pulse 126a of waveform 126. This pulse is sustained as long as waveform 130 exceeds threshold level 121. Pulse 126a is applied to counter 206 which is reset and thereafter begins counting timing pulses derived from timing pulse source 209. The negative staircase signal, represented by waveform portion 134a, appears at the output of operational amplifier 208. This level is applied to one input of comparator 210 to be compared against the voltage reference thickness size which is a measurement of the time interval during which the double thickness condition persists. This time period is also directly translatable into a length measurement indicating that if the double thickness condition exists over at least a predetermined threshold length, then an indication of a reject condition should be provided. This is accomplished by adjusting threshold level 136 so that, when negative staircase signal 134a drops below threshold level 136, comparator 210 develops output pulse 138a indicative of a thickness reject condition.

As soon as the double thickness condition reduces to a single thickness condition, waveform 130 abruptly drops as shown by waveform portion 130c. The roller assemblies 34, 34' thereafter closely and accurately track the sheet as represented by waveform portion 130d. The sheet which has a very small folded corner at its trailing edge causes a signal to abruptly change as represented by waveform portion 130e which surpasses threshold level 121, causing comparator 204 to yield pulse 126b. Due to the short length of the trailing edge folded corner, the signal represented by waveform 130 remains above threshold 121 for only a brief interval yielding a narrow width pulse 126b, resulting in a negative staircase signal 134b of very short duration. The negative staircase signal 134b fails to drop below threshold level 136 and does not yield a thickness reject signal, at least for the trailing edge of the sheet.

As can clearly be seen from a consideration of FIGS. 6, 7a and 7b, when the pulse 126a developed by comparator 204 is terminated, counter 206 is reset. As soon as the next pulse 126b is developed, a new independent negative staircase signal is developed. Although the example given herein shows the signals developed in the presence of a sheet having folded corners at the leading and trailing edges, it should be noted that any discrepancies in thickness of the sheet being examined anywherein the region between the leading and trailing edges, will also be detected. For example, the presence of a strip of an adhesive bearing transparent tape, quite frequently employed for repairing a torn bill, will also be detected and will generate a thickness comparison signal and possibly a thickness reject signal if the length of the adhesive strip is at least equal to the length represented by the setting of level 136. It should be noted that level 136 is adjustable as represented by arm 211 of potentiometer R92. It is thus possible to develop more than two thickness comparison and reject signals during the examination of a single sheet. As a result, the apparatus 10 can also function as a device capable of detecting the presence of overlapping sheets as well as sheets having folded corners or other conditions which result in a greater than normal thickness.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for detecting abnormalities in the thickness of sheets fed to said apparatus in single file at substantially regularly spaced intervals with finite gaps between adjacent sheets, said apparatus comprising:
   a first roller formed of a hard material being rotatable about a first, fixed axis;
   a displaceable assembly mounted to swing about a second fixed axis;
   a second roller formed of a hard material having a smooth cylindrical surface and being rotatably mounted on said displaceable assembly a predetermined distance from said second fixed axis;
   high speed drive means for positively driving and thereby rotating said first roller at high speed;
   said drive means including resilient means entrained about said first roller and engaging said second roller to rotate said second roller even in the absence of sheets;

field generating means mounted on said assembly a second predetermined distance from said second fixed axis;

biasing means normally positioning said second roller adjacent said first roller by exerting a strong force upon said displaceable assembly for urging said second roller toward said first roller responsive to displacement of said second roller from said first roller and compressing said resilient means;

adjustable means for adjusting the strength of the biasing force exerted by said bias means upon said displaceable assembly;

stationary sensing means positioned adjacent said field generating means for generating a signal representing the measured field strength of the field developed by said field generating means, said signal representing the displacement distance of said second roller relative to said first roller due to sheets passing therebetween;

means for comparing the signal of said sensing means against a predetermined thickness threshold;

the force of said bias means being sufficient to significantly attenuate overshoot of the displaceable assembly and to substantially prevent "bounce" of said assembly while enabling the second roller means to accurately track the thickness profile of the sheet to thereby significantly enhance the ability of said sensor to generate a signal which accurately represents the thickness profile of a sheet passing between said first and second rollers and thereby prevent the signal developed by said sensing means from erroneously exceeding said threshold level.

2. The apparatus of claim 1 further comprising mounting means for adjustably mounting said sensor means to assure proper alignment of the sensor means relative to said field generating member.

3. The apparatus of claim 1 wherein said bias means comprises an elongated metallic member of substantial thickness;

mounting means for retaining a first end of said member in a stationary position, the opposite end thereof being positioned to exert a biasing force upon said assembly.

4. The apparatus of claim 1 wherein said assembly comprises a first member rotatably mounted upon a first pivot at a first end thereof;

the opposite end of said member rotatably supporting said second roller;

an elongated arm having a first end secured to said member adjacent said first end and supporting said field generating element at the opposite end thereof, the distance between said field generating member and said pivot being significantly greater than the distance between said first pivot and the axis of rotation of said second roller.

5. The apparatus of claim 4 wherein said former distance is at least twice said latter distance.

6. The apparatus of claim 3 wherein said adjusting means comprises an elongated threaded member having a first end threadedly engaging a tapped opening provided in the free end of said biasing member and having the opposite end thereof engaging said assembly.

7. The apparatus of claim 6 wherein said assembly includes an anvil member secured to said assembly and having a highly durable hard-wearing surface for engaging said elongated threaded member.

8. The apparatus of claim 1 further comprising lever means secured to said displaceable assembly and swingable from a first position for retaining said assembly in the operative condition to a second position displacing said second roller away from said first roller.

9. The apparatus of claim 1 wherein said field generating member is a permanent magnet and said sensor is a sensor element of the Hall-effect type.

10. The apparatus of claim 1 wherein said first roller is an elongated roller having an axial length greater than the width of the sheet engaging said first roller, said width being measured in a direction transverse to the direction of movement of said sheet;

said second roller having an axial length which is significantly less than the axial length of said first roller and being positioned so that one side edge of said sheet arranged transverse to the leading and trailing edges thereof engages said second roller at a location intermediate the ends of said second roller to facilitate the detection of folded corners.

11. The apparatus of claim 1, wherein said drive means further comprises motor means and said resilient means comprises belt means coupling the output of said motor means to said first roller for imparting rotation to said first roller.

12. The apparatus of claim 11 wherein said belt means comprise a plurality of resilient compressible O-rings.

13. The apparatus of claim 12 wherein said first roller is provided with a plurality of annular grooves arranged at axially spaced intervals along the periphery thereof, each being adapted to position and seat an associated one of said O-rings.

14. The apparatus of claim 13 wherein said displaceable assembly is adjusted to cause said second roller to engage the surfaces of selected ones of said O-rings for rotating said second roller.

15. The apparatus of claim 14 further comprising a third elongated roller pivotally mounted about a third stationary axis;

belt means entrained about said third roller and cooperating with the belt means entrained about said first roller means for guiding and delivering sheets moving therebetween away from said apparatus.

16. The apparatus of claim 13 wherein said adjustable means adjusts said assembly to cause said second roller to place the portion of said O-rings engaged by said second roller under at least slight compression.

17. Apparatus for detecting the presence of changes in the thickness of sheets delivered to said apparatus in a one-at-a-time fashion at spaced intervals, said apparatus comprising:

a first elongated roller rotatable about a first fixed axis;

first and second displaceable assemblies arranged to independently swing about a common second fixed axis;

each of said displaceable assemblies including an idler roller formed of a hard material and having a smooth surface and mounted to rotate about an axis on said swingable assembly arranged a predetermined distance from said second fixed axis;

high speed drive means for rotating said first roller and including resilient means engaging said idler rollers for rotating said idler rollers even in the absence of sheets;

field generating means on each swingable assembly;

biasing means having a large biasing force;

first and second adjustable means engaging said first and second swingable assemblies for independently adjusting the biasing force exerted by said biasing means upon its associated swingable assembly for urging said idler rollers toward said first roller;

first and second sensing means positioned adjacent an associated one of said field generating means for generating a signal representing the displacement distance of an associated one of said idler rollers relative to said first roller due to the passage of said sheets through said apparatus;

means for comparing each of said signals against a predetermined thickness threshold for detecting an abnormal thickness condition;

the force of said bias means being sufficient to prevent said displaceable assemblies from experiencing a large overshoot and for substantially instantaneously returning said idler rollers in rolling engagement with a sheet while yielding sufficiently to enable displacement of the idler rollers to very accurately track the thickness profile of a sheet passing through the apparatus and thereby prevent said sensing means from erroneously developing an abnormal thickness signal.

18. The apparatus of claim 17 wherein said bias means comprises first and second elongated arms each formed of a metallic material;
mounting means for maintaining a first end of each of said arms in a stationary position whereby the opposite free ends of said arms are positioned to urge said adjustable means into engagement with an associated one of said swingable assemblies.

19. The apparatus of claim 18 wherein said bias means comprises a substantially U-shaped member formed of a metallic material and comprising a yoke portion and integral first and second arms extending from said yoke portion;
mounting means for maintaining said yoke portion in a stationary position and so that the free ends of said arms urge said adjustable means into engagement with an associated one of said swingable assemblies.

20. The apparatus of claim 19 wherein the intermediate portion of said yoke portion is provided with an elongated slot to permit flexing of one of said integral arms independently of the other of said integral arms, and vice versa.

21. The apparatus of claim 17 wherein said first elongated roller has an axial length which is greater than the width of the sheets passing through said apparatus, said width being measured in the direction transverse to the direction of movement and parallel to the leading and trailing edges thereof;
each of said idler rollers each having an axial length which is less than one-half the axial length of said first roller;
said idler rollers being positioned so that opposite side edges of a sheet engage the surface of said idler rollers intermediate the ends thereof.

22. The apparatus of claim 17 wherein said bias means comprises an elongated metallic member of substantial thickness;
mounting means for retaining a first end of said member in a stationary position, the opposite end thereof being positioned to exert a biasing force upon said assembly.

23. The apparatus of claim 17 wherein each of said assemblies comprises a first member rotatably mounted upon said first pivot at a first end thereof;
the opposite end of said member rotatably supporting said idler roller;
an elongated arm having a first end secured to said member adjacent said first end and supporting said field generating element at the opposite end thereof, the distance between said field generating member and said pivot being significantly greater than the distance between said first pivot and the axis of rotation of said idler roller.

24. The apparatus of claim 22 wherein said adjusting means comprises an elongated threaded member having a first end threadedly engaging a tapped opening provided in the free end of said biasing member and having the opposite end thereof engaging one of said assemblies.

25. The apparatus of claim 17 wherein said field generating member is a permanent magnet and said sensor is a sensor element of the Hall-effect type.

26. The apparatus of claim 17 further comprising drive means and belt means extending between said drive means and said first roller for imparting rotation to said first roller.

27. The apparatus of claim 26 wherein said first roller is provided with a plurality of annular grooves arranged at spaced intervals along the periphery thereof, each positioning and seating an associated one of said belt means.

28. The apparatus of claim 27 wherein said assembly is adjusted to cause said idler roller to engage the surface of selected ones of said belt means for rotating said idler rollers.

29. The apparatus of claim 28 further comprising third elongated roller means pivotally mounted about a third stationary axis;
belt means entrained about said third roller means and cooperating with the belt means entrained about said first roller means for guiding and delivering sheets moving therebetween away from said apparatus.

30. The apparatus of claim 29 wherein said adjustable means adjusts said assembly to cause said second roller to place the portion of said belt means engaging said second roller under at least slight compression.

31. The apparatus of claim 30 wherein the surfaces of said idler roller are displaced from said first roller.

32. Means for measuring the thickness of sheets comprising first movable means responsive to the passage of sheets and displaceable by a distance which is a function of sheet thickness;
field generating means mounted on said movable means;
sensor means responsive to displacement of said field generator means relative to said senosr means for generating a signal having a magnitude which is a function of the displacement experienced by said first movable means;
the signal developed by said sensor means also being affected by ambient temperature; and
means enabled prior to each sheet entering the thickness measuring means for generating a nulling signal substantially equal to the signal developed by said sensor means in the absence of sheets for nulling the effect of temperature on the output signal of said sensor means.

33. Means for measuring the thickness of sheets comprising first movable means responsive to the passage of sheets and displaceable by a distance which is a function of sheet thickness;
  field generating means mounted on said movable means;
  sensor means responsive to displacement of said field generator means relative to said sensor means for generating a signal having a magnitude which is a function of the displacement experienced by said first movable means;
  the signal developed by said sensor means also being affected by ambient temperature; and
  means for nulling the effect of temperature on the output signal of said sensor means;
  means for comparing the nulled output signal of said sensor means with a predetermined threshold level for generating a signal when said compensated signal exceeds said threshold level indicating that the sheet being examined has a thicknes greater than a nominal thickness established by said threshold level.

34. The means of claim 33 further comprising means for generating a signal of varying amplitude responsive to said comparator during the period that said compensated signal exceeds said threshold level;
  means for comparing said varying amplitude signal with a second reference level for generating a signal indicating that the length of the greater than nominal thickness condition has exceeded a predetermined nominal length represented by said second reference level.

35. The means of claim 34 wherein such signal generating means comprises means for generating a staircase signal.

36. The means of claim 35 wherein said staircase signal generating means comprises counter means having a plurality of counter stages;
  impedance elements each having a first end coupled to one of said stages and a second end coupled to a common impedance means for generating a signal which is a function of the count which is developed in said counter.

37. The means of claim 36 wherein the impedance elements coupled to respective stages of said counter have differing impedance values.

38. The means of claim 37 wherein the impedance values of each impedance element is double the impedance value of the next adjacent impedance element.

39. Means for measuring the thickness of sheets comprising first movable means responsive to the passage of sheets and displaceable by a distance which is a function of sheet thickness;
  field generating means mounted on said movable means;
  sensor means responsive to displacement of said field generator means relative to said sensor means for generating a signal having a magnitude which is a function of the displacement experienced by said first movable means;
  the signal developed by said sensor means also being affected by ambient temperature; and
  means for nulling the effect of temperature on the output signal of said sensor means;
  said nulling means comprising summing means having a first input for receiving the output of said sensing means and having a second input for receiving a compensating signal whereby said compensating signal is of a magnitude and a polarity sufficient to null the output of said sensor means; and
  said nulling signal means comprises potentiometer means.

40. Means for measuring the thickness of sheets comprising first movable means responsive to the passage of sheets and displaceable by a distance which is a function of sheet thickness;
  field generating means mounted on said movable means;
  sensor means responsive to displacement of said field generator means relative to said sensor means for generating a signal having a magnitude which is a function of the displacement experienced by said first movable means;
  the signal developed by said sensor means also being affected by ambient temperature; and
  means for nulling the effect of temperature on the output signal of said sensor means;
  said nulling means comprising summing means having a first input for receiving the output of said sensing means and having a second input for receiving a compensating signal whereby said comensating signal is of a magnitude and a polarity sufficient to null the output of said sensor means;
  said nulling signal means comprising means for generating a signal of varying amplitude;
  comparator means for comparing the output of said summing means with the output of said signal generating means; and
  means responsive to a comparison of said signals by said comparison means for retaining said variable amplitude generating means at the level at which comparison occurred.

41. Means for measuring the thickness of sheets comprising first movable means responsive to the passage of sheets and displaceable by a distance which is a function of sheet thickness;
  field generating means mounted on said movable means;
  sensor means responsive to displacement of said field generator means relative to said sensor means for generating a signal having a magnitude which is a function of the displacement experienced by said first movable means;
  the signal developed by said sensor means also being affected by ambient temperature; and
  means for nulling the effect of temperature on the output signal of said sensor means;
  said measuring means further comprising means responsive to the absence of sheets passing through said apparatus for de-activating said measuring means.

42. Apparatus for detecting abnormalities in the thickness of sheets fed to said apparatus in single file at substantially regularly spaced intervals, said apparatus comprising:
  a first roller rotatable about a first, fixed axis;
  a displaceable assembly mounted to swing about a second fixed axis;
  a second roller rotatably mounted on said assembly a predetermined distance from said second fixed axis;
  field generating means mounted on said assembly a second predetermined distance from said second fixed axis;
  biasing means normally positioning said second roller adjacent said first roller and which is sufficiently yieldable to enable said second roller to track the thickness of a sheet;

adjustable means for adjusting the magnitude of the biasing force exerted by said bias means upon said assembly;

stationary sensing means positioned adjacent said field generating means for generating a signal representing the measured field strength of the field developed by said field generating means, said signal representing the displacement distance of said second roller relative to said first roller due to sheets passing therebetween;

the force of said bias means being sufficient to significantly attenuate overshoot of the second roller means and to substantially prevent "bounce" of said assembly to thereby significantly enhance the ability if said sensor to track the profile of a sheet passing between said first and second rollers;

a signal of the sensor means also being affected by ambient temperature;

means enabled prior to each sheet entering the thickness measuring apparatus for generating a signal equal to the output of the sensor means for nulling the effect of temperature on the output signal of said sensor means.

43. The apparatus of claim 17 further comprising spacer means including spring means arranged on a common axis with said displaceable assemblies for maintaining said assemblies spaced apart a predetermined distance.

44. The apparatus of claim 1 further comprising stationary adjustable limiting means engaging said displaceable assembly for limiting the displacement distance between the first and second rollers.

45. The apparatus of claim 1 wherein said adjustable means comprises a differential adjustment assembly.

46. The apparatus of claim 44 wherein said adjustable limiting means comprises a differential adjustment assembly.

47. The apparatus of claim 1 wherein said adjustable means comprises a first threaded member threaded about its exterior and having a hollow tapped interior;

said bias means having a tapped opening receiving and threadedly engaging first threaded member;

a second threaded member threadedly engaging the hollow tapped interior of said first threaded member;

a third member having a tapped opening at a first end thereof;

said second threaded member threadedly engaging the tapped opening in said third member;

means for preventing rotation of said third member while enabling axial movement of said third member along the longitudinal axis of said second threaded member;

locking means for locking said third member to said second threaded member;

one end of said second threaded member engaging said displaceable assembly;

the senses of the interior and exterior threads of said first threaded member being opposite one another, and the pitches of said interior and exterior threads being different from one another to sense said first and second threaded members to move in opposite axial directions when said first threaded member is rotated to accurately adjust the spacing between said bias means and said displaceable assembly.

48. The apparatus of claim 47 wherein the pitch of the exterior threaded portion of said first threaded member is greater than the pitch of the tapped hollow interior thereof.

49. The apparatus of claim 48 wherein the exterior pitch is 28 threads per inch and the interior pitch is 32 threads per inch.

50. The apparatus of claim 1 wherein said bias means is a plate of a resilient steel material having a thickness of the order of 0.25 inches.

51. The apparatus of claim 50 wherein said steel material is a tempered, hardened steel material.

52. The apparatus of claim 50 wherein the bendable portion of said plate is of the order of 2.75 inches.

* * * * *

UNITED STATES PATENT AND TRADEMARK OFFICE
CERTIFICATE OF CORRECTION

PATENT NO. : 4,426,785
DATED     : January 24, 1984
INVENTOR(S) : Peter J. Loftus, Stephen J. Horvath It is certified that error appears in the above-identified patent and that said Letters Patent is hereby corrected as shown below:

Column 4, line 26, change "relativ" to --relative--..

Column 6, line 27, change "78b" to --78d--,

Column 8, line 6, change "wingably" to --swingably--.

Column 9, line 59, change "as" to --a--.

Column 13, line 22, change "196" to --236--.

In the Claims:

Claim 16, column 18, line 46, after "said" (first occurrence) insert --displaceable--.

Signed and Sealed this

Fifteenth Day of January 1985

[SEAL]

Attest:

Attesting Officer

GERALD J. MOSSINGHOFF

Commissioner of Patents and Trademarks